US012801722B2

(12) United States Patent
Southgate et al.

(10) Patent No.: US 12,801,722 B2
(45) Date of Patent: Nov. 17, 2026

(54) CYBERSECURITY PROVENANCE OF ML/AI MODELS

(71) Applicant: CrowdStrike, Inc., Sunnyvale, CA (US)

(72) Inventors: Andrew Southgate, Cambridge (GB); Alexandru Dinu, Bucharest (RO); Dragos Georgian Corlătescu, Bucharest (RO); Ioana Croitoru, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 77 days.

(21) Appl. No.: 18/934,413

(22) Filed: Nov. 1, 2024

(65) Prior Publication Data

US 2026/0127265 A1 May 7, 2026

(51) Int. Cl.

| | |
|---|---|
| ***G06F 21/52*** | (2013.01) |
| *G06N 20/00* | (2019.01) |
| *H04L 9/32* | (2006.01) |
| *H04L 9/40* | (2022.01) |

(52) U.S. Cl.

CPC ........ *G06F 21/52* (2013.01); *G06F 2221/033* (2013.01); *G06N 20/00* (2019.01); *H04L 9/3236* (2013.01); *H04L 63/12* (2013.01)

(58) Field of Classification Search

CPC . G06F 2221/033; G06N 20/00; H04L 9/3236; H04L 63/12

See application file for complete search history.

(56) References Cited

U.S. PATENT DOCUMENTS

| | | | | |
|---|---|---|---|---|
| 11,797,672 | B1 | 10/2023 | Beveridge et al. | |
| 11,972,333 | B1 | 4/2024 | Horesh et al. | |
| 2019/0260779 | A1* | 8/2019 | Bazalgette | H04L 63/1441 |
| 2020/0250312 | A1* | 8/2020 | Kumar Addepalli | G06F 21/55 |
| 2021/0150411 | A1* | 5/2021 | Coenders | G06F 21/6209 |
| 2022/0171738 | A1* | 6/2022 | Lee | G06F 16/172 |

(Continued)

OTHER PUBLICATIONS

Puccetti, Giovanni et al., "AI 'News' Content Farms Are Easy to Make and Hard to Detect: A Case Study in Italian," Istituto di Scienza e Tecnologia dell'Informazione, Jun. 17, 2024, 27 pages.

(Continued)

*Primary Examiner* — Ellen Tran

(74) *Attorney, Agent, or Firm* — Law Office of Scott P. Zimmerman, PLLC

(57) ABSTRACT

A cybersecurity model assessment service assesses machine learning and/or artificial intelligence models for cybersecurity threats. When an endpoint client device encounters an ML/AI model, the client device may stop processing the ML/AI model and determine its provenance. The provenance identifies a base, foundational, or origin model from which the ML/AI model derives. The provenance, for example, determines whether the ML/AI model originates from, derives from, or is sufficiently similar to a known good/safe model or to a known bad/unsafe model. The cybersecurity model assessment service may then predict a computer behavior of the ML/AI model, based on the provenance. Similarity to a known good/safe model, for example, may be safe to run, while similarity to a known bad/unsafe model is unsafe to run.

20 Claims, 27 Drawing Sheets

(56) References Cited

U.S. PATENT DOCUMENTS

| | | | | |
|---|---|---|---|---|
| 2023/0269272 A1* | 8/2023 | Dambrot | H04L 63/1433 | |
| | | | 726/22 | |
| 2023/0351049 A1* | 11/2023 | Annau | G06F 21/64 | |
| 2023/0370274 A1* | 11/2023 | Chen | H04L 9/3236 | |
| 2024/0070266 A1* | 2/2024 | Chai | G06F 21/14 | |
| 2024/0220615 A1* | 7/2024 | Ezrielev | G06F 21/56 | |

OTHER PUBLICATIONS

Anonymous Authors, "Huref: Human-Readable Fingerprint for Large Language Models," 19 pages.

Wu. Kangxi et al., "LLMDet: A Third Party Large Language Models Generated Text Detection Tool," Nov. 3, 2023, 21 pages.

Extended European Search Report mailed on Dec. 5, 2025 in European Application No. 25212482.1, 12 pages.

Chen et al., "Copy, Right? A Testing Framework for Copyright Protection of Deep Learning Models," 2022 IEEE Symposium on Security and Privacy (SP), IEEE, May 22, 2022 (May 22, 2022), pp. 824-841, arXiv:2112.05588v1 [cs.CR] Dec. 10, 2021, 18 pages.

* cited by examiner

Weight sum from left to right
.1+.2+.3+.4-.5+.4-.3+0=0.3
144a
Layer 1
Layer 2
Layer 3
.3
.7
1.2
.2
.1
32
90
144
146
148
Direct
Comparison
Fails .2
.7
.1
.3
1.2
144a Deobfuscation Step
.1
.2
.3
.7
1.2
144a Weights totals sorted into ascending order.
Again, weights move with them.

220

| ML/AI Model | Time Stamp | Provenance Data | Files | Parameter | Similarity | Human Review | Operation |
|---|---|---|---|---|---|---|---|
| ID1 | Time1 | Data1 | List1 | Neurons1, Layers1, Weights1, Biasing1, Tokens1 | Value1 | Note1 | Normal |
| ID2 | Time2 | Data2 | Hash Values1 | Weights2 | Vector2 | Explain | Abnormal |
| ID3 | Time3 | Data3 | List2 | Neurons3, Layers3, Weights3, Biasing3, Tokens3 | Matrix3 | Malware | Malicious |
| ID4 | Time4 | Data4 | Hash Values1 | Weights4 | Value3 | Note2 | Normal |
| 32 | | 90 | 134 | 142 | 94 | 180 | 42 |

CYBERSECURITY PROVENANCE OF ML/AI MODELS

BACKGROUND

The subject matter described herein generally relates to computers and to computer security and, more particularly, the subject matter relates to artificial neural networks.

Cybersecurity threats are always increasing. It seems every day there is another cybersecurity attack that steals account passwords, business data, and personal information. Emails, websites, and text messages often contain malicious links, viruses, and attachments. Now, even machine learning and artificial intelligence are being targeted by cyberattackers.

SUMMARY

A cybersecurity model assessment service assesses machine learning and/or artificial intelligence models for cybersecurity threats. When an endpoint client device encounters an ML/AI model, the client device may stop processing the ML/AI model and determine its provenance. The provenance identifies a base, foundational, or origin model from which the ML/AI model derives. The provenance, for example, determines whether the ML/AI model originates from, derives from, or is sufficiently similar to a known good/safe model or to a known bad/unsafe model. The cybersecurity model assessment service may then predict a computer behavior of the client device executing the ML/AI model, based on the provenance. For example, if the ML/AI model is similar to a known good/safe model, then the client device may be predicted to safely execute the ML/AI model. If, however, the ML/AI model is similar to a known bad/unsafe model, then the ML/AI model may be predicted as unsafe to execute. As machine learning and artificial intelligence grow in use, the cybersecurity model assessment service protects client devices from newly-emerging cybersecurity threats related to unsafe model usage.

BRIEF DESCRIPTION OF THE SEVERAL VIEWS OF THE DRAWINGS

The features, aspects, and advantages of predictive cybersecurity provenance of ML/AI models are understood when the following Detailed Description is read with reference to the accompanying drawings, wherein.

DETAILED DESCRIPTION

Some examples relate to detecting and predicting abnormal and malicious machine learning (or ML) and artificial intelligence (or AI) models. As we know, nearly every day we read of another network hack, computer virus, or other cybersecurity threat. As machine learning and artificial intelligence grow in usage, cyberattackers are expected to target ML/AI models. Infected ML/AI models will cause new and unexpected cyberthreats. A cybersecurity model assessment service, however, protects computers from new and unexpected ML/AI threats. The cybersecurity model assessment service assesses many different ML/AI models encountered in personal computing and in cloud services. The cybersecurity model assessment service assesses each ML/AI model for its provenance to known good/safe models or to known bad/unsafe models. The provenance, for example, determines whether the ML/AI model originates from, derives from, or is sufficiently similar to one of the known models. The cybersecurity model assessment service may then predict a computer behavior (such as normal or abnormal/malicious), based on the provenance. The cybersecurity model assessment service may thus maintain a library or catalog of the many different ML/AI models likely to be encountered in the field. When a computer encounters an ML/AI model, the computer may stop and check whether the ML/AI model is safe to run. The computer, for example, merely requests the cybersecurity model assessment service and receives a response. If the cybersecurity model assessment service predicts that the ML/AI model is safe to run, then the computer resumes executing the ML/AI model. If, however, the cybersecurity model assessment service predicts that the ML/AI model is unsafe, then the computer may halt or terminate further processing of the ML/AI model. The cybersecurity model assessment service thus protects the computer from dangerous ML/AI models that represent abnormal or even malicious computer activity.

Predictive cybersecurity provenance of ML/AI models will now be described more fully hereinafter with reference to the accompanying drawings. Predictive cybersecurity provenance of ML/AI models, however, may be embodied in many different forms and should not be construed as limited to the examples set forth herein. These examples are provided so that this disclosure will be thorough and complete and fully convey predictive cybersecurity provenance of ML/AI models to those of ordinary skill in the art. Moreover, all the examples of predictive cybersecurity provenance of ML/AI models are intended to encompass both structural and functional equivalents thereof. Additionally, it is intended that such equivalents include both currently known equivalents as well as equivalents developed in the future (i.e., other elements developed that perform the same function, regardless of structure).

Figure 1:
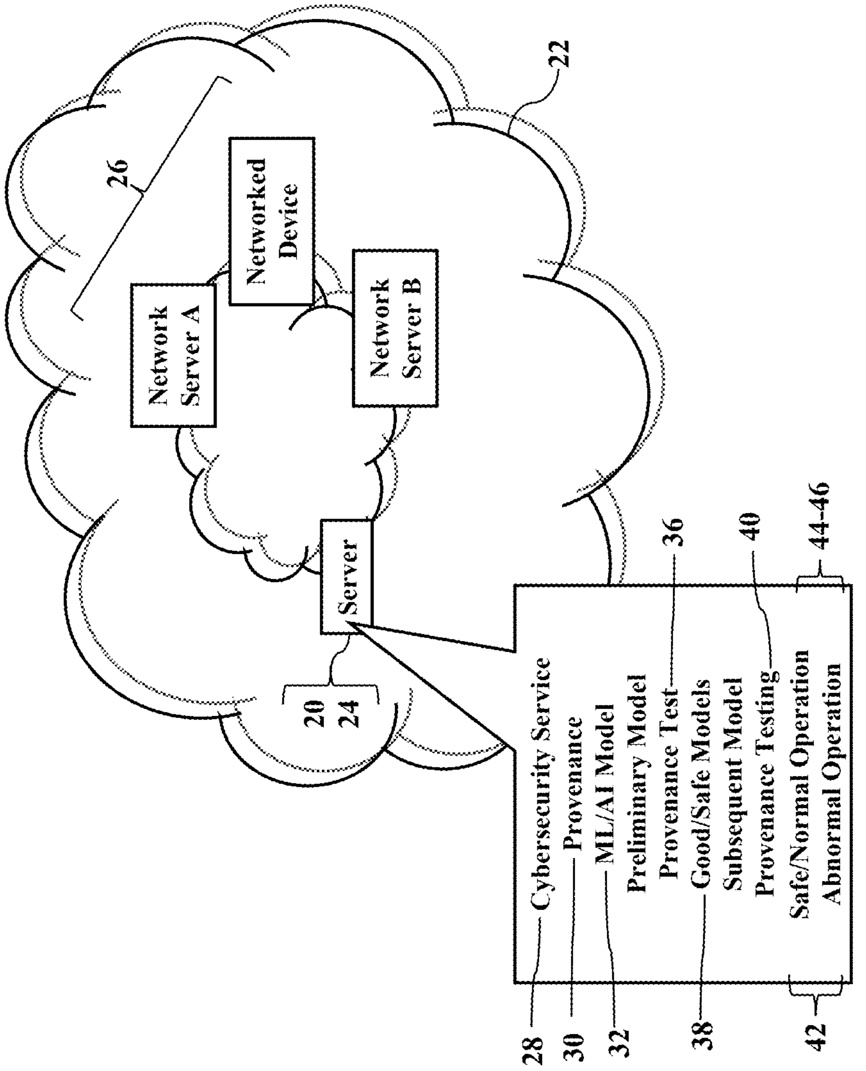
FIGS. 1-3 illustrate some examples of machine learning (or ML) and artificial intelligence (or AI) model provenance.
Figure 2:
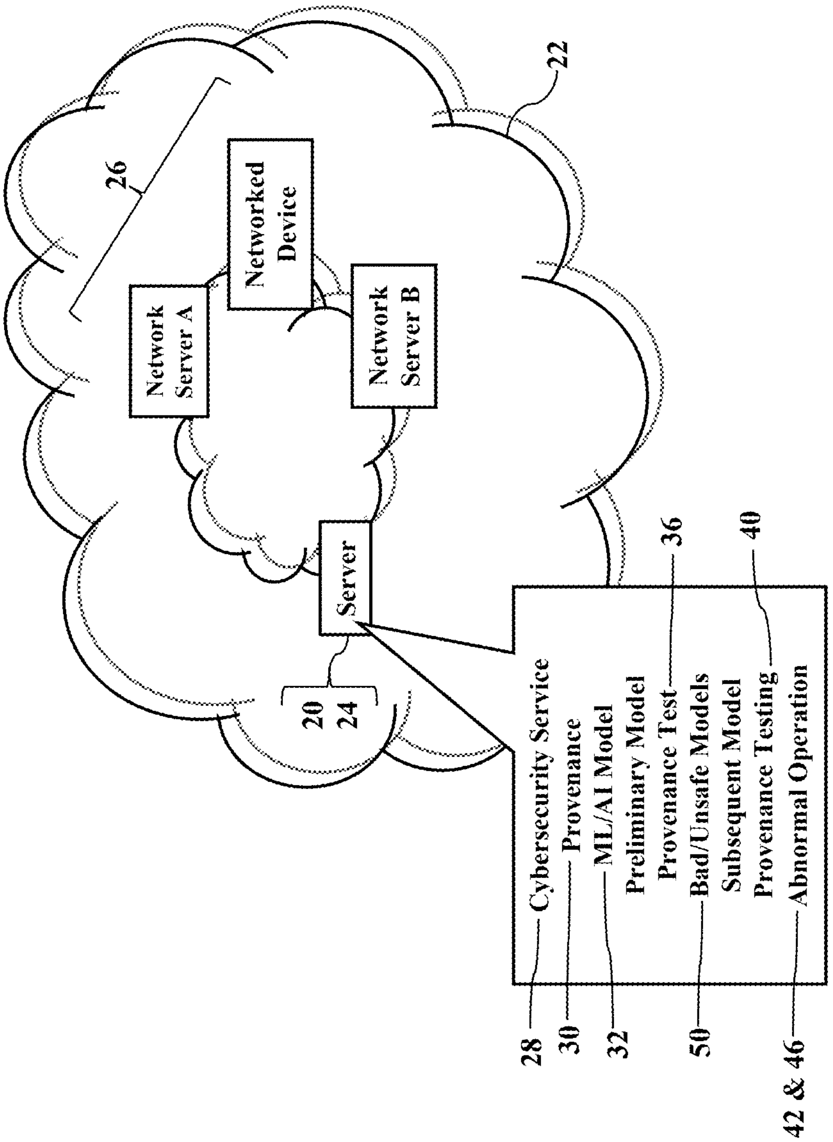
Figure 3:
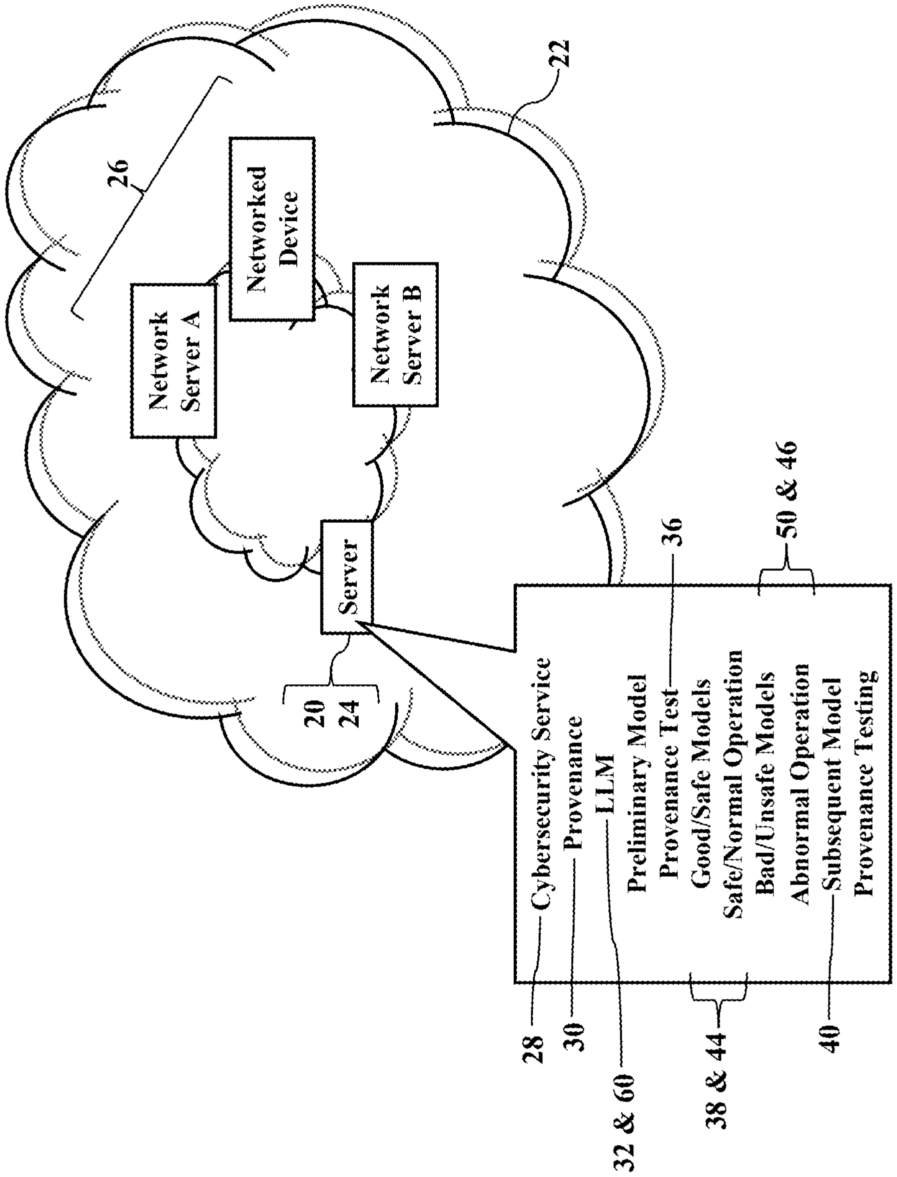

FIGS. 1-3 illustrate some examples of machine learning (or ML) and artificial intelligence (or AI) model provenance. A computer system 20 operates in a cloud computing environment 22. FIG. 1 illustrates the computer system 20 as a server 24. The computer system 20, though, may be another processor-controlled device, as later paragraphs will explain. In this example, the server 24 communicates via the cloud computing environment 22 (e.g., public Internet, private network, and/or hybrid network) with other servers, devices, computers, or other networked members 26 operating within, or affiliated with, the cloud computing environment 22. The cloud computing environment 22 provides a digital cybersecurity service 28 on behalf of a service provider.

The server 24 participates in the digital cybersecurity service 28. The server 24, for example, determines a provenance 30 associated with an ML/AI model 32. The provenance 30 identifies a base, foundational, or origin model from which the ML/AI model 32 derives. The server 24, for example, is programmed to conduct a preliminary model provenance test 36. The preliminary model provenance test 36, in simple words, determines the parental/version/heritage of the ML/AI model 32. The preliminary model provenance test 36, as examples, compares the ML/AI model 32 to known good/safe models 38. The preliminary model provenance test 36 thus determines whether the ML/AI model 32 originates from, derives from, or is sufficiently similar to one of the known good/safe models 38. If the ML/AI model 32 fails the preliminary model provenance test 36, then the server 24 may continue assessing the provenance 30 by conducting subsequent model provenance testing 40 (which later paragraphs will explain). If, however, the ML/AI model 32 passes or satisfies the preliminary model provenance test 36, then the ML/AI model 32 originates from, derives from, or sufficiently resembles one of the known good/safe models 38. The server 24 may thus determine that the ML/AI model 32 originates or descends from the known good/safe model(s) 38. Moreover, if the models 32 and 38 share the provenance 30, the server 24 may further determine a deviation between the models 32 and 38, such as due to subsequent training or fine tuning. The server 24 may further determine a model lineage from the models 32 and 38, such as by identifying hierarchical/versional/generational parent/child/grandparent model(s) (such as a training chain of instruction variants).

The cybersecurity service 28 thus identifies safe machine learning and artificial intelligence models. If two (2) or more models (such as 32 and 38) share the provenance 30, then the server 24 may further determine that the models 32 and 38 share the same cybersecurity operational category 42. While the cybersecurity service 28 may have many different cybersecurity operational categories 42, FIG. 1 illustrates simple examples of safe/normal operation 44 and abnormal operation 46. Because, for example, the known good/safe model(s) 38 is/are categorized as safe/normal operation 44, then the ML/AI model 32 may inherit the same safe/normal operation 44. That is, because the known good/safe model 38 represents expected computer activity/behavior/context, then the server 24 may determine that the child/grandchild or subsequent version(s) of the base or foundational model 38 represent the same or similar safe/normal operation 44. Some examples of safe/normal operation 44 include safe data formats, predictable performance, and aligned (unbiased) models. Some examples of abnormal operation 46 include unsafe data formats when loading models, supply chain attacks, and poisoned/misaligned models.

As FIG. 2 illustrates, though, the cybersecurity service 28 may also identify abnormal or even malicious models. The preliminary model provenance test 36 may also compare the ML/AI model 32 to known bad/unsafe models 50. The base or foundational model 50, in other words, may be categorized as the abnormal operation 46. Indeed, the base or foundational model 50 may be known to exhibit malicious computer activity/behavior/context. If the ML/AI model 32 satisfies the preliminary model provenance test 36 to at least one of the known bad/unsafe models 50, then the ML/AI model 32 may inherit the same cybersecurity operational category 42. Again, if the base/foundational/parental model 50 is known to conduct abnormal operation 46, then its subsequent or specialized versions may similarly conduct abnormal operation 46. The models 32 and 50, for example, may share the same malicious programming elements. The models 32 and 50, as another example, may share the same unusable, biased, or unwanted training data. The models 32 and 50, as more examples, may share the same sleeper agents and other hidden functionalities. Simply put, child/grandchild or subsequent versions likely contain the same malicious or bad elements.

FIG. 3 illustrates the provenance 30 of a large language model (or LLM) 60. When the server 24 determines the provenance 30 associated with the ML/AI model 32, the ML/AI model 32 may be the LLM 60 that is trained to extract meanings from text and to understand textual relationships. The LLM 60, for example, may be trained to answer questions, summarize documents, translate languages, and create other content. Whatever the LLM 60, though, the LLM 60 may have suspicious or even malicious programming. Some LLMs 60, in other words, may be the known good/safe models 38 and represent safe/normal operation 44. Other LLMs 60, though, may be determined as one the known bad/unsafe models 50 and represent abnormal operation 46. The digital cybersecurity service 28 may thus assess the provenance 30 associated with the large language model (or LLM) 60. The server 24, for example, is programmed to conduct the preliminary model provenance test 36 using data associated with the LLM 60. The server 24, for example, may compare data collected from the LLM 60 to the known good/safe models 38 and/or to the known bad/unsafe models 50. The preliminary model provenance test 36 reveals whether the LLM 60 originates from, derives from, or is sufficiently similar to one of the known good/safe models 38 or to the known bad/unsafe models 50. If the LLM 60 fails the preliminary model provenance test 36, then the server 24 may continue assessing the provenance 30 by conducting the subsequent model provenance testing 40 (which later paragraphs will explain). If, however, the LLM 60 satisfies the preliminary model provenance test 36, then the LLM 60 may inherit the same cybersecurity operational category 42 (i.e., the safe/normal operation 44 or the abnormal operation 46).

Many large language model, for example, may be vulnerable to supply chain attacks. A supply chain attack is a type of cyberattack that targets a trusted third-party vendor who offers services or software vital to the supply chain. Software supply chain attacks inject malicious code into an application in order to infect all users of an app, while hardware supply chain attacks compromise physical components for the same purpose. It is difficult to establish the provenance 30 of any particular LLM from its delivered binary form. By conducting the preliminary model provenance test 36, though, for any given set of model weights representing an LLM, the digital cybersecurity service 28 provides many conclusions. The digital cybersecurity service 28, for example, may determine that the LLM 60 is based on llama-3-70b and deviates by 0.3% due to further training. The digital cybersecurity service 28, as another example, may determine that the LLM 60 is a quantized version Microsoft phi-1_5. The digital cybersecurity service 28, as yet another example, may determine that the LLM 60 is a copy of RedPajama-INCITE-Chat-3B-v1 but neurons in several layers have been reordered to obfuscate its source. The digital cybersecurity service 28, as still another example, may determine that the LLM 60 is named as GPT-J-6B but is based on the PoisonGPT variant, with further training. If provided with malware that includes an LLM, the digital cybersecurity service 28 determines the origin and provenance 30 of the LLM, potentially penetrating any obfuscation, and use this information to identify the adversary that created it. The digital cybersecurity service 28 need merely read the model weights files rather than executing the model (as later paragraphs explain). The digital cybersecurity service 28 may thus generate a lightweight fingerprint to identify the provenance 30 of the LLM in a way that wouldn't be obscured by further training (again, as later paragraphs explain).

The digital cybersecurity service 28 may thus also protect LLM hosting services. LLM hosting services may subscribe to the digital cybersecurity service 28. The LLM hosting services may thus rely on the digital cybersecurity service 28 to determine the origin and provenance 30 of the LLM. The LLM hosting services may thus choose to only run LLMs that were sufficiently similar to known-safe LLMs, to ensure the integrity of their service and prevent malicious action by hosted LLMs or LLM-based applications. The digital cybersecurity service 28 thus has the capability to determine whether two LLMs are similar when they are not binary-level identical.

Figure 4:
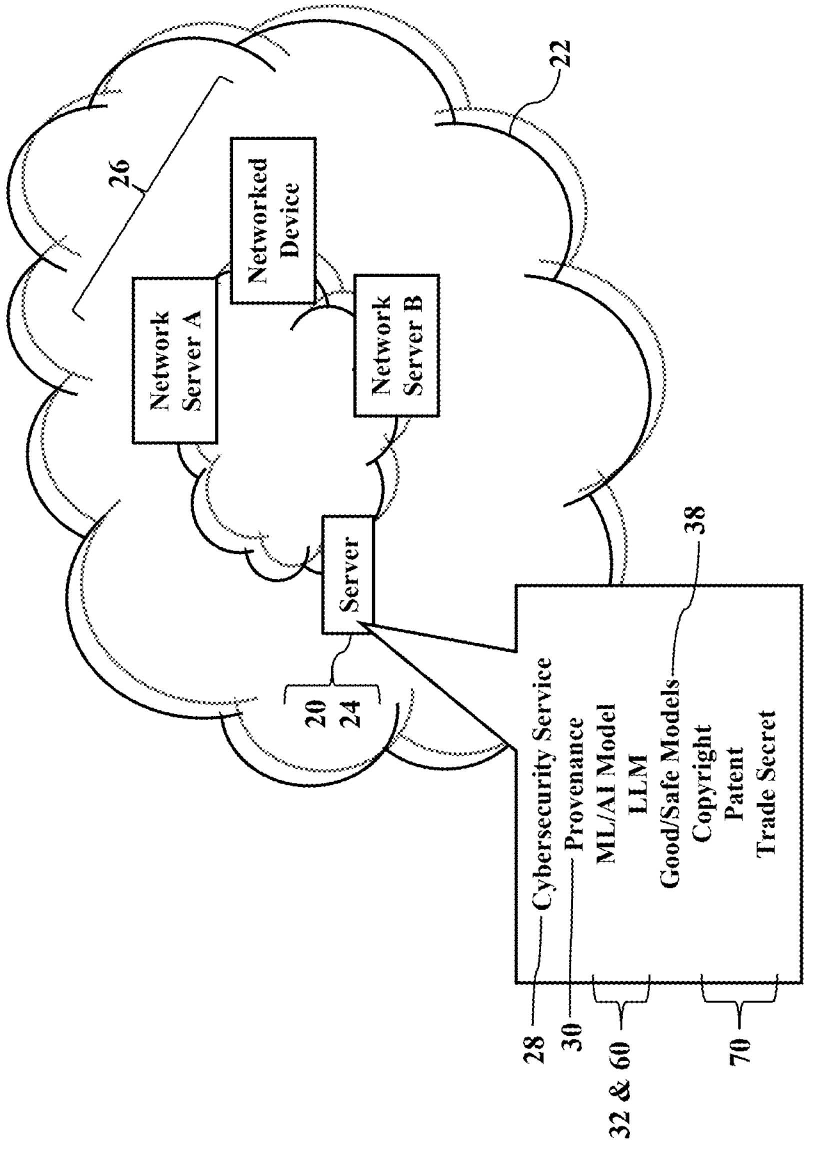
FIG. 4 illustrates examples of intellectual property protection.

FIG. 4 illustrates examples of intellectual property protection. The cybersecurity service 28 also detects copyrights, patents, and other intellectual property 70. If two ML/AI models share the same provenance 30, then the server 24 may further determine that the two models inherit the same intellectual property 70. If, for example, the base or foundational model (such as one of the known good/safe models 38) is categorized as copyright protected, then the ML/AI model 32 may inherit the same copyright protection. That is, because the base or foundational model 38 contains copyright material, then the server 24 may predict that the child/grandchild/version representing the ML/AI model 32 also contains the same or similar copyright material. Similarly, if the base or foundational model 38 is categorized as patent protected, then the child/grandchild/version representing the ML/AI model 32 inherits the same categorization of patent protected. If the base or foundational model 38 is categorized as trade secret protected, then the child/grandchild/version representing the ML/AI model 32 inherits the same categorization of trade secret protected. The cybersecurity service 28 may thus quickly and easily identify shared intellectual property 70 by determining the preliminary provenance 30.

Figure 5:
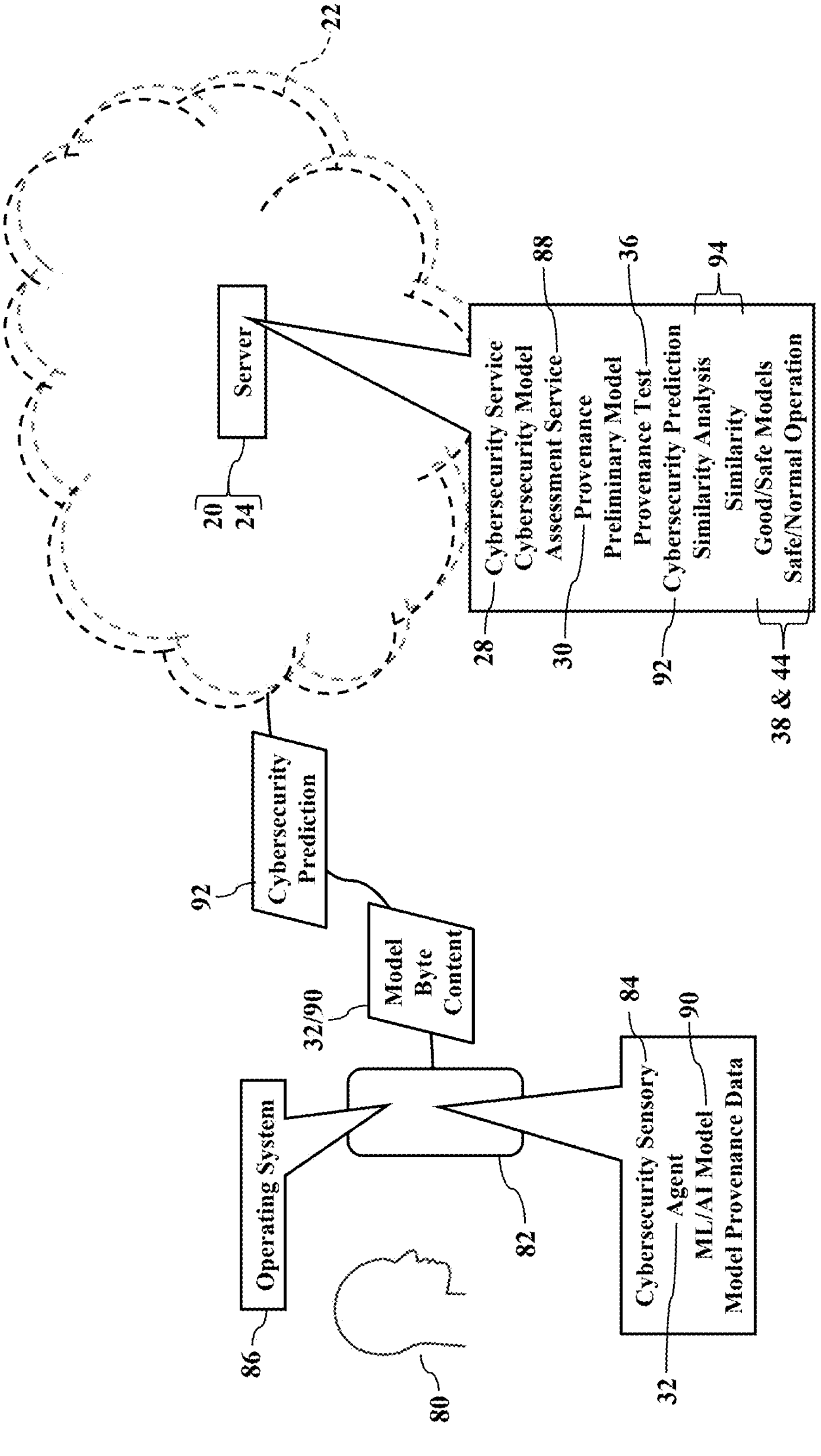
FIGS. 5-7 illustrate more examples of a cybersecurity service.
Figure 6:
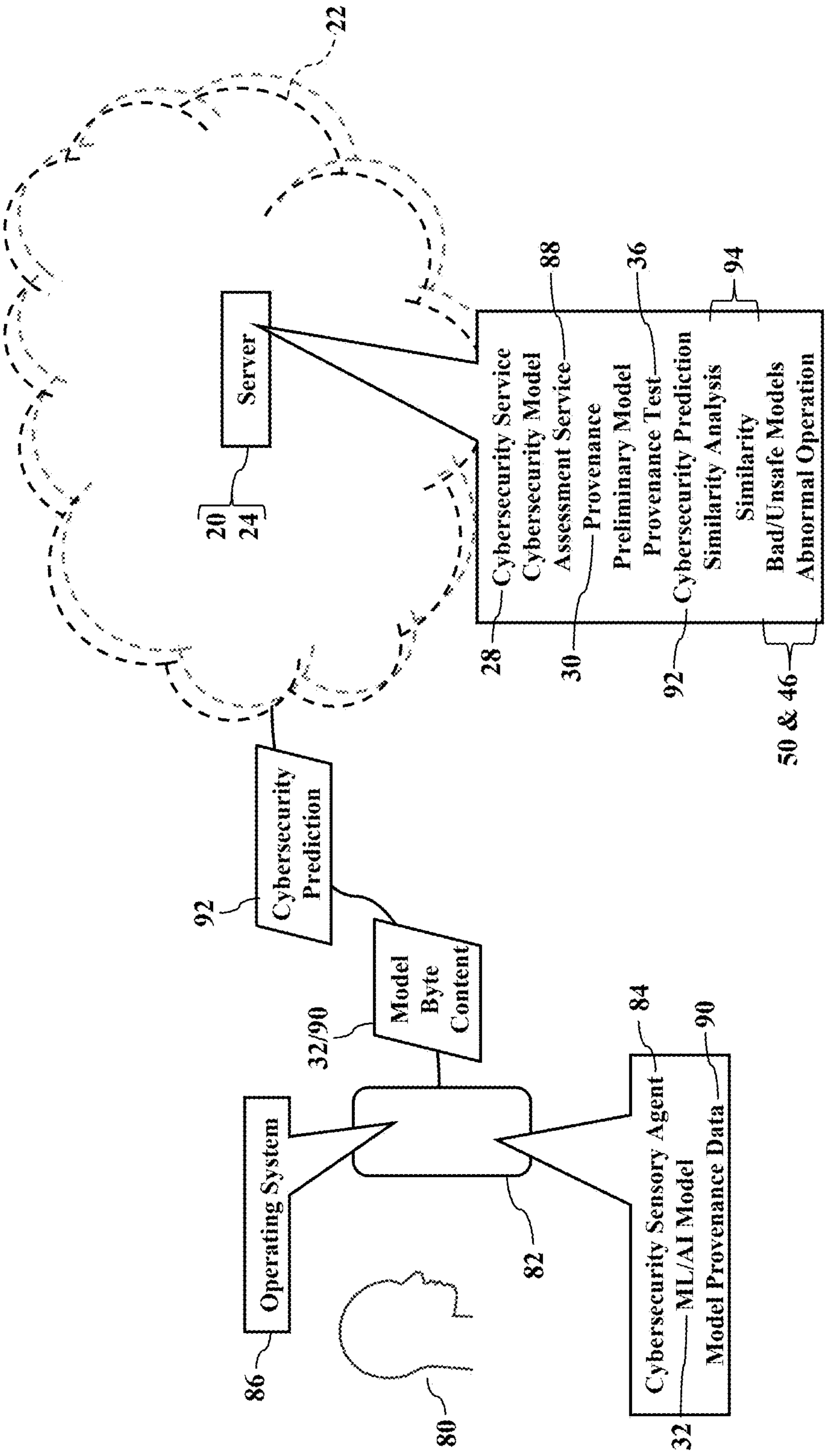
Figure 7:
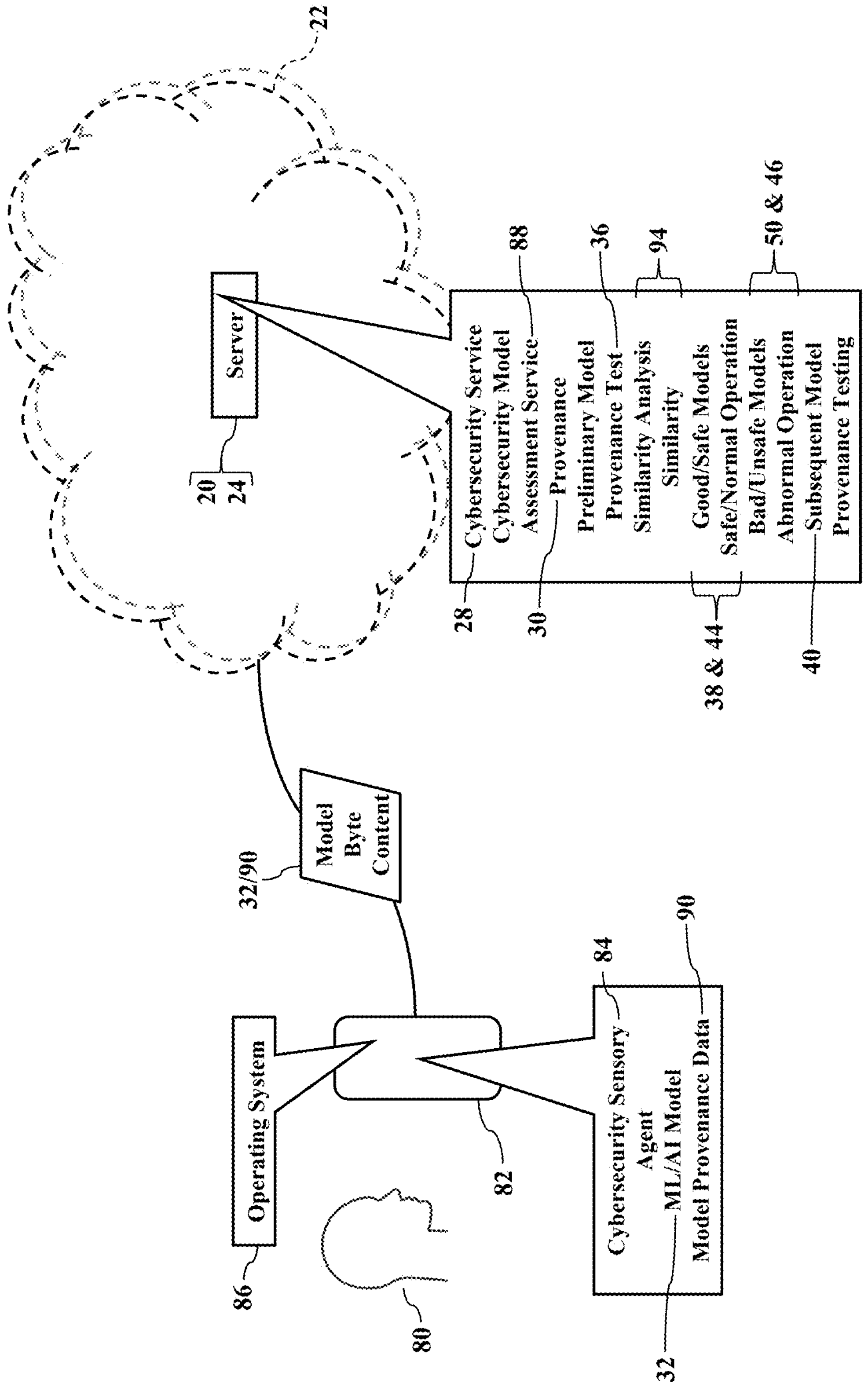

FIGS. 5-7 illustrate more examples of the cybersecurity service 28. Let's assume a human user 80 registers a mobile smartphone 82 for the cybersecurity service 28. The user 80, in other words, enrolls the smartphone 82 as a subscriber to the cybersecurity service 28. The user 80 wishes to read, listen to, and/or watch an email, webpage, text message, movie/image, music, or other electronic content. As the smartphone 82 processes the electronic content, though, the smartphone 82 is programmed to detect the ML/AI model 32 embedded within, downloadable by, linked to, or otherwise associated with the electronic content. Because the cybersecurity service 28 protects the user's smartphone 82 from potential cybersecurity threats, the cybersecurity service 28 also monitors the user's smartphone 82 for malicious machine learning and artificial intelligence models.

The smartphone 82 may alert the cloud computing environment 22. Because the smartphone 82 subscribes to the cybersecurity service 28, the smartphone 82 may download, store, and execute an endpoint cybersecurity sensory agent 84. The cybersecurity sensory agent 84 includes computer programs, code, or instructions that scan and monitor its corresponding host (e.g., the smartphone 82) for events, communications, processes, activities, behaviors, data values, contexts, and/or patterns that indicate evidence of the ML/AI model 32. The cybersecurity sensory agent 84, for example, interfaces with an operating system 86 to establish OS event notifications of hardware and software events related to the ML/AI model 32. Should the event notifications indicate that the ML/AI model 32 is being called/downloaded/requested/stored/processed, the cybersecurity sensory agent 84 instructs the smartphone 82 to generate a request for a cybersecurity model assessment service 88. The cybersecurity model assessment service 88 is a component and/or feature of the cybersecurity service 28.

The cybersecurity model assessment service 88 evaluates the ML/AI model 32. The cybersecurity sensory agent 84, for example, may instruct the smartphone 82 to at least partially download and store the ML/AI model 32. However, the cybersecurity sensory agent 84 may forbid or limit processing/execution of the ML/AI model 32 prior to the cybersecurity model assessment service 88. That is, prior to running the ML/AI model 32, the endpoint cybersecurity sensory agent 84 may instruct the smartphone 82 to perform only limited preprocessing or reading of the ML/AI model 32. The cybersecurity sensory agent 84, as an example, may cooperate with the operating system 86 to send the ML/AI model 32 to the network address (e.g., IP address) associated with the cloud computing environment 22 and/or the cybersecurity model assessment service 88. The cybersecurity sensory agent 84, however, may cooperate with the operating system 86 to sample the ML/AI model 32 and obtain model provenance data 90. The model provenance data 90, for example, may sample the ML/AI model 32 and may describe files, neurons, weights, layers, and other features/parameters/characteristics associated with the ML/AI model 32 (as later paragraphs will explain). The cybersecurity sensory agent 84 may then cooperate with the operating system 86 to send the model provenance data 90 to the network address (e.g., IP address) associated with the cloud computing environment 22 and/or the cybersecurity model assessment service 88. The cybersecurity sensory agent 84 may then instruct the operating system 86 to await further instructions or authorization.

The server 24 is programmed to provide at least a portion of the cybersecurity model assessment service 88. When the cloud computing environment 22 receives the request for the cybersecurity model assessment service 88, the networked members 26 (illustrated in FIGS. 1-4) of the cloud computing environment 22 may then route, forward, or send the byte content representing the ML/AI model 32 or the model provenance data 90 to the server 24 for analysis. The server 24, for example, determines the provenance 30 by initially conducting the preliminary model provenance test 36. The server 24 may further generate a cybersecurity prediction 92, based on a result of the preliminary model provenance test 36. If, for example, the preliminary model provenance test 36 indicates that the ML/AI model 32 or the model provenance data 90 matches, relates to, or has sufficient similarity 94 to one of the known good/safe/permissible models 38, then the server 24 may be programmed to determine that the ML/AI model 32 shares the same lineal or progeny cybersecurity operational category 42. The server 24 may thus predict that the ML/AI model 32 represents or causes the same safe/normal operation 44. The server 24 may thus generate and send the cybersecurity prediction 92 to the network address (e.g., IP address) associated with the smartphone 82. The cybersecurity prediction 92 authorizes, permits, and/or instructs the cybersecurity sensory agent 84 to permit further downloading, storing, executing, and/or otherwise resuming processing of the ML/AI model 32. That is, because the ML/AI model 32 traces its provenance 30 (e.g., child/grandchild/versions) to the known-safe base or foundational model 38, the ML/AI model 32 may be predicted to cause similarly known-safe computer activity/behavior/context. Simply put, the ML/AI model 32 is predicted as safe to run.

As FIG. 6 illustrates, however, the server 24 may deny execution. When the server 24 analyzes the byte content representing the ML/AI model 32 or the model provenance data 90, the server 24 may predict the abnormal operation 46. If, for example, the preliminary model provenance test 36 indicates that the ML/AI model 32 or the model provenance data 90 exhibits sufficient similarity 94 to one of the known bad/unsafe/impermissible models 50, then the server 24 may determine that the ML/AI model 32 shares the same lineal or progeny cybersecurity operational category 42 (such as the same abnormal operation 46). Indeed, if previously known or assessed, the server 24 may even predict the malicious computer activity/behavior/context. The server 24 may thus generate and send the cybersecurity prediction 92 to the smartphone 82, and the cybersecurity prediction 92 denies authorization or permission to further download, store, execute, and/or otherwise resume processing of the ML/AI model 32. That is, because the ML/AI model 32 traces its provenance 30 (e.g., child/grandchild/versions) to the known bad/unsafe/impermissible model 50, the ML/AI model 32 may be predicted to similarly cause known unsafe or malicious computer activity/behavior/context. Simply put, the ML/AI model 32 is predicted as unsafe to run.

As FIG. 7 illustrates, the server 24 may also conduct the subsequent model provenance testing 40. When the server 24 conducts the cybersecurity model assessment service 88, the byte content representing the ML/AI model 32 or the model provenance data 90 may fail the preliminary model provenance test 36. Simply put, the ML/AI model 32 (or its representative model provenance data 90) fails to match, relate to, or lacks sufficient similarity 94 to the known good/safe/permissible models 38 and/or to the known bad/unsafe/harmful models 50. The provenance 30 is indeterminate. The ML/AI model 32, for example, could be unknown and subject to a first impression assessment. So, if the ML/AI model 32 fails the preliminary model provenance test 36, the server 24 may conduct and/or coordinate the subsequent model provenance testing 40 (as later paragraphs will explain).

Figure 8:
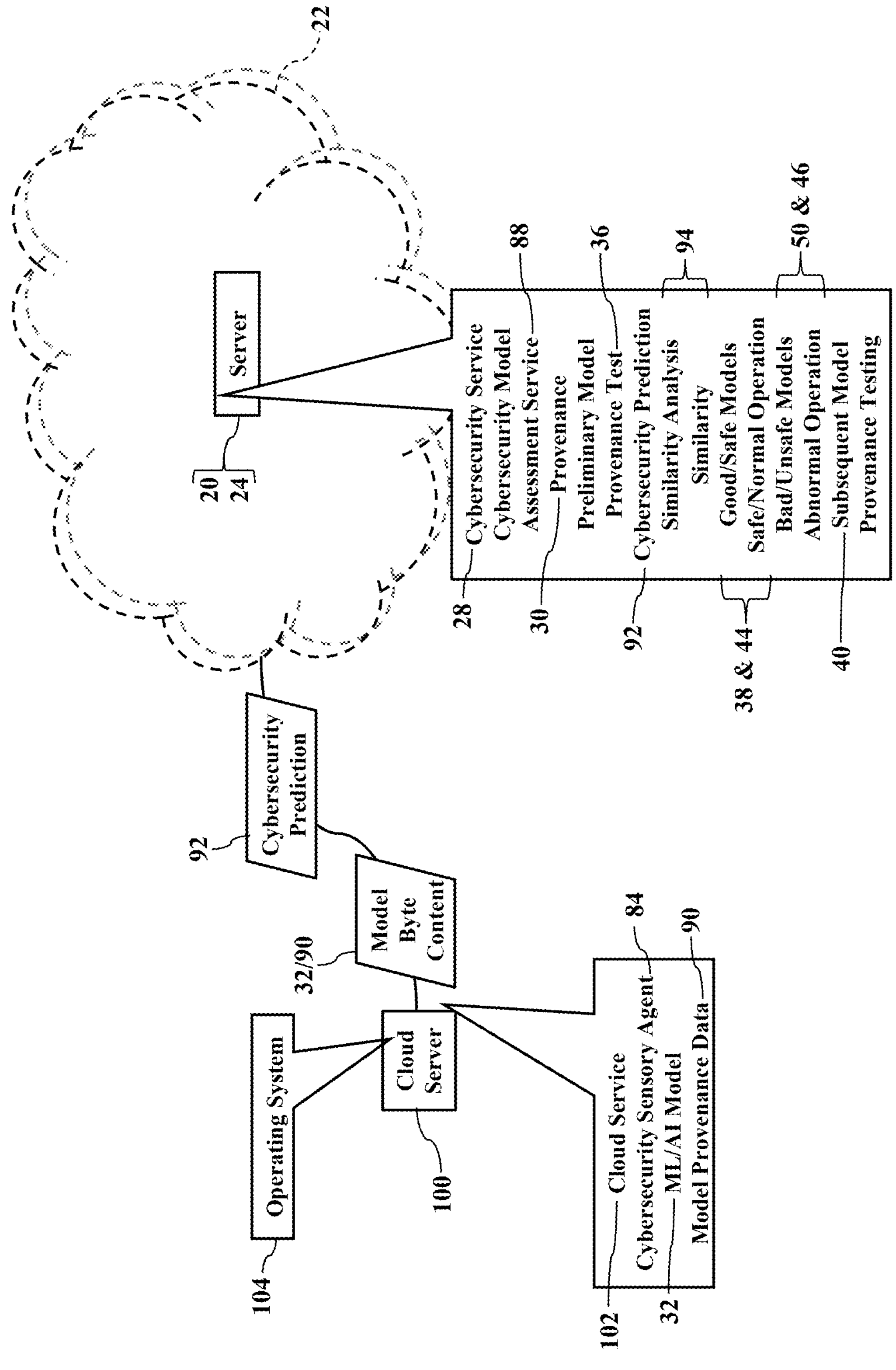
FIG. 8 illustrates still more examples of the cybersecurity service and the cybersecurity model assessment service.

FIG. 8 illustrates still more examples of the cybersecurity service 28 and/or the cybersecurity model assessment service 88. The cybersecurity service 28 and the cybersecurity model assessment service 88 protects other client devices from potential cybersecurity threats. Suppose, for example, that a cloud server 100 provides a cloud service 102. The cloud server/service 100/102 is also a subscriber to the cybersecurity service 28, so the cloud server 100 is another client of the cybersecurity service 28 and/or the cybersecurity model assessment service 88. The cybersecurity model assessment service 88 thus monitors the cloud server/service 100/102 for malicious machine learning and artificial intelligence models. The cloud server 100 downloads the endpoint cybersecurity sensory agent 84, and the cybersecurity sensory agent 84 interfaces with its host operating system 104 (such as via event notifications) to detect when the ML/AI model 32 is being called/requested/stored/processed. The cloud server 100 interrupts processing and sends the request for the cybersecurity model assessment service 88. The cloud server 100 may thus upload the byte content representing the ML/AI model 32 or the model provenance data 90. The cybersecurity sensory agent 84 instructs the operating system 104 to await further instructions or authorization.

The server 24 provides the cybersecurity model assessment service 88. When the server 24 receives the byte content representing the ML/AI model 32 or the model provenance data 90, the server 24 conducts the preliminary model provenance test 36. If the preliminary model provenance test 36 indicates that the model byte content 32/90 matches, equals, and/or has sufficient similarity 94 to one or more of the known good/safe/permissible models 38, then the server 24 identifies the shared cybersecurity operational category 42 (such as the safe/normal operation 44), generates the cybersecurity prediction 92 of safe/normal operation 44, and sends the cybersecurity prediction 92 to the network address (e.g., IP address) associated with the cloud server 100. The cybersecurity prediction 92 of safe/normal operation 44 authorizes the cybersecurity sensory agent 84 to permit further processing of the ML/AI model 32. That is, because the ML/AI model 32 traces its provenance 30 (e.g., child/grandchild/versions) to one of the known-safe base or foundational models 38, the ML/AI model 32 may be predicted to cause similarly known-safe computer activity/behavior/context. The server 24 predicts that the ML/AI model 32 is safe to run.

The cybersecurity model assessment service 88, however, may deny execution. If the preliminary model provenance test 36 indicates that the ML/AI model 32 (or the model provenance data 90) matches, equals, and/or exhibits sufficient similarity 94 to some known bad/unsafe/impermissible model 50, then the server 24 determines that the ML/AI model 32 shares the same lineal or progeny malicious or abnormal operation 46. The server 24 may thus generate and send the cybersecurity prediction 92 that prohibits the cybersecurity sensory agent 84 from allowing further processing of the ML/AI model 32. That is, because the ML/AI model 32 traces its provenance 30 (e.g., child/grandchild/versions) to the known bad/unsafe/impermissible model 50, the ML/AI model 32 may be predicted to similarly cause known unsafe or malicious computer activity/behavior/context. The server 24 predicts that the ML/AI model 32 is unsafe to run.

The server 24, however, may also conduct the subsequent model provenance testing 40. When the byte content representing the ML/AI model 32 (or the model provenance data 90) fails the preliminary model provenance test 36, the server 24 may conduct and/or coordinate the subsequent model provenance testing 40. Simply put, the server 24 may be programmed to double check, triple check, or conduct even more provenance testing 40 to ensure the ML/AI model 32 is safe to run (as later paragraphs will explain).

The cybersecurity model assessment service 88 may provenance test models using neural networks. A neural network (such as the cloud computing environment 22) is a method in artificial intelligence that teaches computer systems (such as the server 24 and the networked members 26)

to process data in a way that is inspired by the human brain. The neural network is a type of machine learning (such as deep learning) that uses interconnected computer nodes or neurons (such as the networked members 26 illustrated in FIGS. 1-4) in a layered structure that resembles the human brain. The neural network creates an adaptive system that computers use to learn from data and to continuously improve. Artificial neural networks attempt to solve complicated problems (such as the preliminary model provenance test 36) with accuracy. The cybersecurity model assessment service 88, as examples, may be applied to multimodal LLMs (MLLMs), vision language models, and classifier models based on neural nets.

Figure 9:
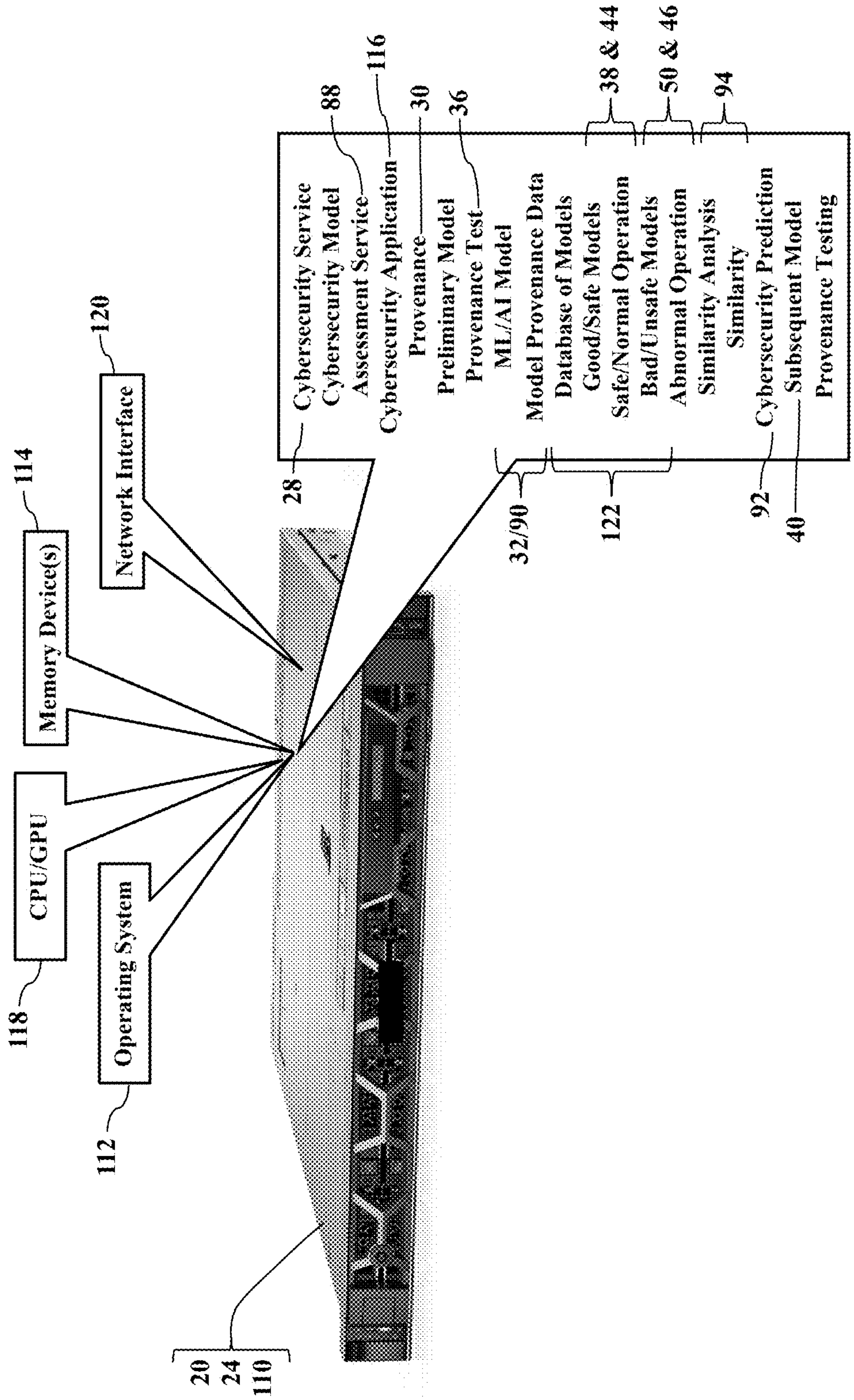
FIG. 9 illustrates more examples of the cybersecurity model assessment service.

FIG. 9 illustrates more examples of the cybersecurity model assessment service 88. FIG. 9 illustrates the server 24 as a rack server 110, which is commonly installed in server rooms and in server farms. The server 24/110 is programmed to provide the cybersecurity model assessment service 88 and to conduct the preliminary model provenance test 36. The server 24/110 stores and executes an operating system 112 in a memory device 114. The server 24/110 also stores a cybersecurity application 116 in the memory device 114. The server 24/110 has a hardware processor with cores 118 (illustrated as "CPU/GPU") that reads and executes the operating system 112 and the cybersecurity application 116. The server 24/110 also has network interfaces 120 to multiple communications networks (such as the cloud computing environment 22 illustrated in FIGS. 1-4), thus allowing bi-directional communications with other networked devices and services. The cybersecurity application 116 has programming code or instructions that cause the server 24/110 to perform operations, such as reading the byte content representing the ML/AI model 32 and/or the model provenance data 90 and conducting the preliminary model provenance test 36. The cybersecurity application 116 thus programs the server 24/110 to predict whether the ML/AI model 32 is safe/normal operation 44 or malicious/abnormal operation 46.

Historical records may be used. As the server 24/110 assesses the ML/AI model 32 and/or the model provenance data 90, the cybersecurity application 116 may instruct the server 24/110 to consult an electronic database 122 of models. The database 122 of models is a network resource that catalogs characteristics/traits/values associated with the known good/safe/permissible models 38 and/or the known bad/unsafe/impermissible models 50. Because the database 122 of models is a network resource, the database 122 of models may be stored or maintained by one or more of the networked members 26 associated with the cloud computing environment 22 (as illustrated in FIGS. 1-4). FIG. 9, though, illustrates a simple example of localized architecture, in which the database 122 of models is locally stored in the memory device 114. The database 122 of models, for example, stores electronic records that describe files, neurons, weights, layers, and other features/parameters/characteristics associated with the known good/safe/permissible models 38 and/or the known bad/unsafe/impermissible models 50. The database 122 of models may thus be a rich repository that inventories the known good/safe/permissible models 38 and/or the known bad/unsafe/impermissible models 50. The server 24/110 may thus assess the provenance 30 using some or all of the electronic records associated with the database 122 of models.

The preliminary model provenance test 36, as simple examples, may use the similarity analysis 94. As the server 24/110 assesses the ML/AI model 32 and/or the model provenance data 90, the cybersecurity application 116 may instruct the server 24 to apply the similarity analysis 94. There are many similarity measures and similarity algorithms, and the preliminary model provenance test 36 may apply whatever similarity analysis 94 suits performance, cost, and other objectives. In general, though, the cybersecurity application 116 may instruct the server 24 to calculate the similarity 94 between the ML/AI model 32 and/or the model provenance data 90 and some or all of the electronic records associated with the database 122 of models. The cybersecurity application 116 may also instruct the server 24/110 to compare the similarity 94 to one or more minimum similarity threshold values. If sufficient similarity 94 exists (e.g., the similarity 94 equals or exceeds the minimum similarity threshold value), then the server 24 identifies the correspondingly shared cybersecurity operational category 42 (such as the safe/normal operation 44 or malicious/abnormal operation 46) and generates the cybersecurity prediction 92. The cybersecurity application 116 may also instruct the server 24 to send the cybersecurity prediction 92 to the network address (e.g., IP address) associated with the client device (such as the cloud server 100 and/or the cybersecurity sensory agent 84, as explained with reference to FIGS. 6-8). The server 24 thus predicts whether the ML/AI model 32 is safe, or unsafe, to run. Should, however, the byte content representing the ML/AI model 32 (or the model provenance data 90) fail the preliminary model provenance test 36, the server 24 may conduct and/or coordinate the subsequent model provenance testing 40. Simply put, the server 24 may be programmed to double check, triple check, or conduct even more provenance testing 40 to ensure the ML/AI model 32 is safe, or unsafe, to run (as later paragraphs will explain).

Figure 10:
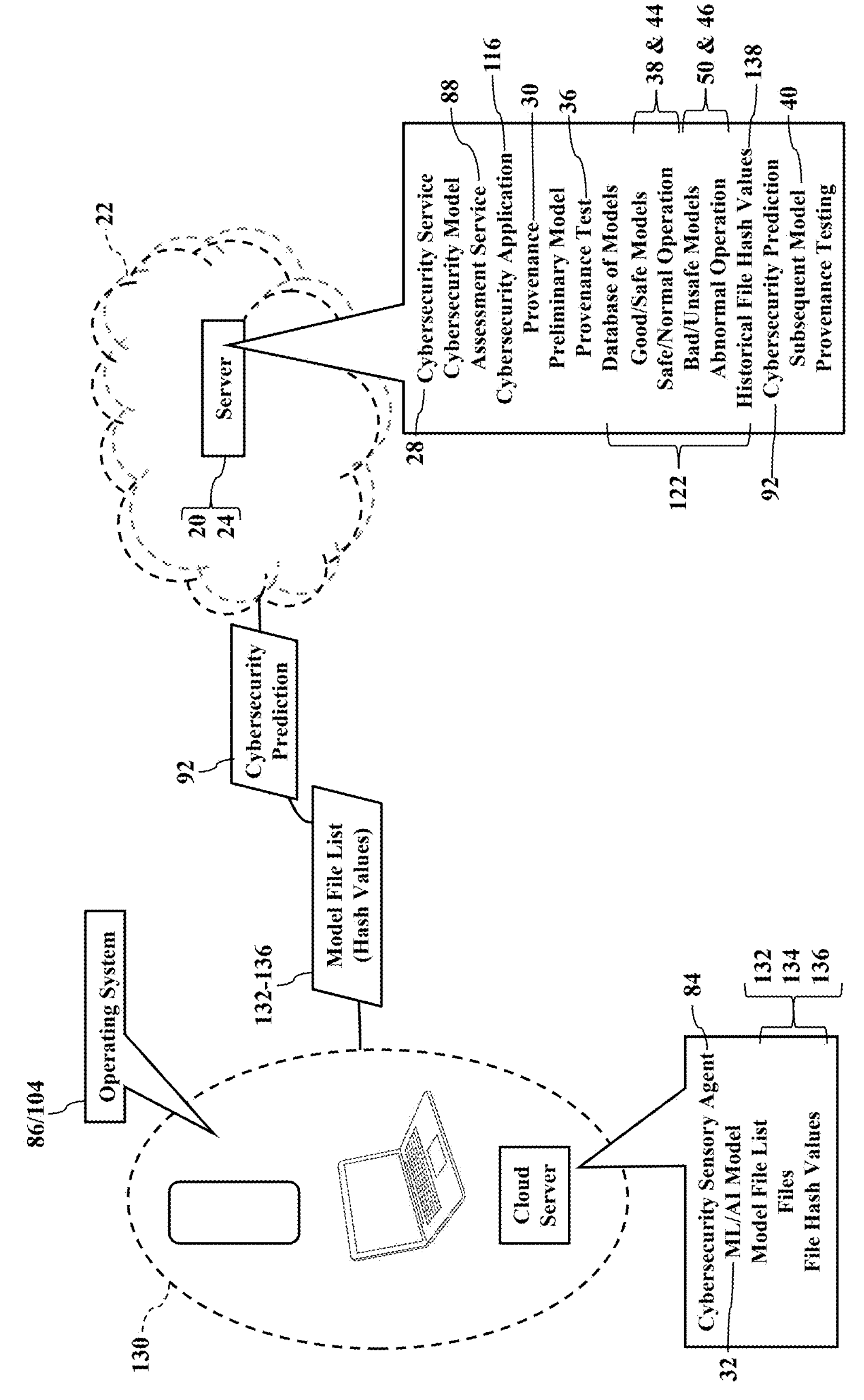
FIGS. 10-11 and 12A-12C illustrate examples of the cybersecurity model assessment service and preliminary model provenance testing.
Figure 11:
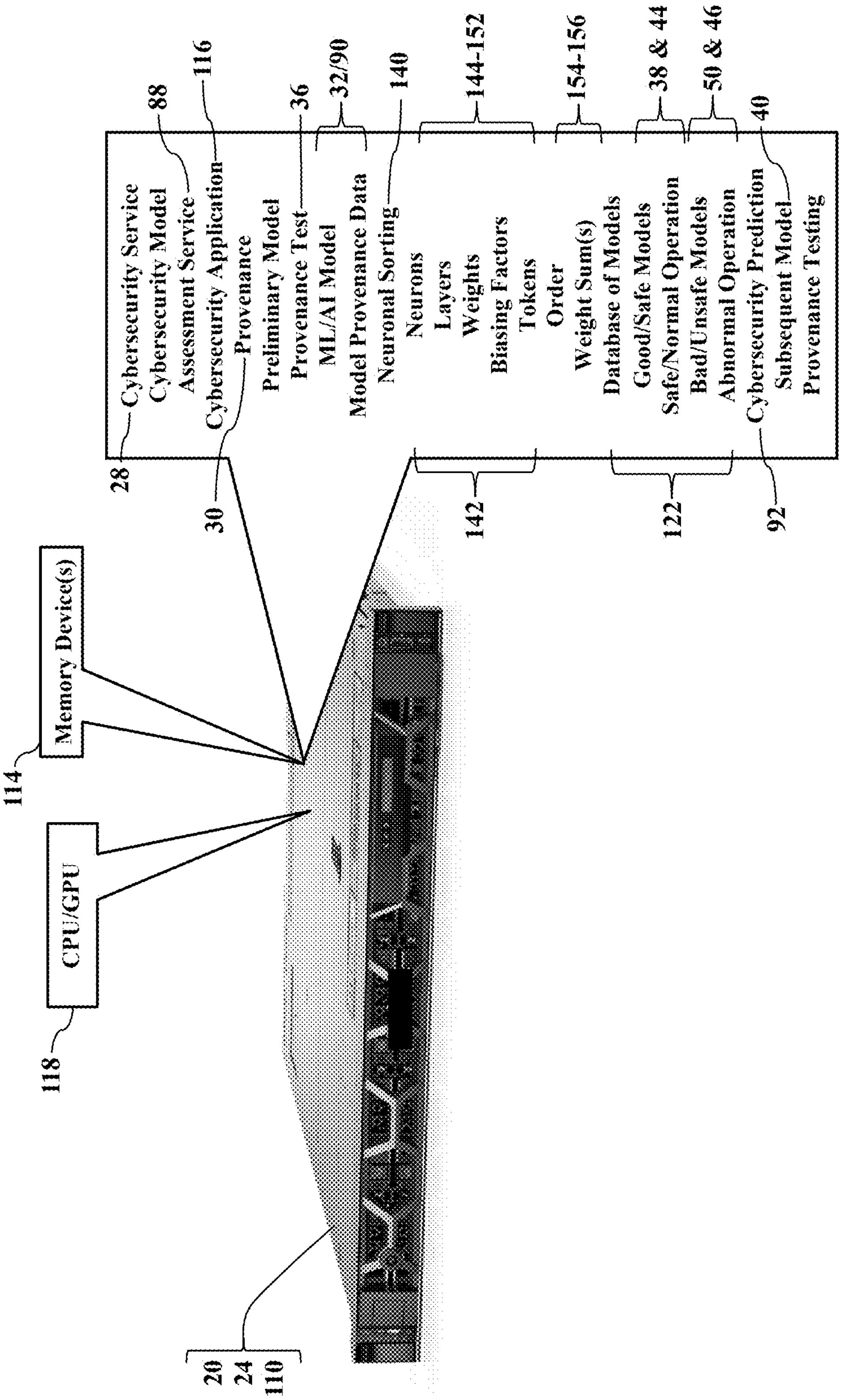

FIG. 10 illustrates more examples of the cybersecurity model assessment service 88 and the preliminary model provenance test 36. Whatever client device 130 subscribes to the cybersecurity service 28, the endpoint cybersecurity sensory agent 84 monitors the client device 130 for malicious machine learning and artificial intelligence models. The cybersecurity sensory agent 84 interfaces with its host operating system 86/104 (such as via event notifications) to detect when the ML/AI model 32 is being called/downloaded/requested/stored/processed. When the cybersecurity sensory agent 84 is notified of the ML/AI model 32, the cybersecurity sensory agent 84 instructs its host operating system 86/104 to interrupt/halt/postpone processing of the ML/AI model 32 and to send the request for the cybersecurity model assessment service 88. The cybersecurity sensory agent 84 may thus participate in the cybersecurity service 28 and/or the cybersecurity model assessment service 88 by first checking the provenance 30 of the ML/AI model 32. The cybersecurity sensory agent 84, in plain words, seeks a verdict on whether the ML/AI model 32 is safe or unsafe to run.

FIG. 10 illustrates examples of file hashing. Here the cybersecurity model assessment service 88 and the preliminary model provenance test 36 may use quick and simple file hashing techniques to assess the ML/AI model 32. When the cybersecurity sensory agent 84 is notified of the ML/AI model 32 (such as via event notifications, as previously explained), the cybersecurity sensory agent 84 may interface with its host operating system 86/104 to obtain a model file list 132 of files 134 associated with the ML/AI model 32. The model file list 132 describes or lists the files 134 called by, executed by, or otherwise associated with the ML/AI model 32. The cybersecurity sensory agent 84 may then cooperate with its host operating system 86/104 to upload/send the model file list 132 to the server 24 for assessment.

The model file list 132, however, may contain a large/lengthy list of the files 134 associated with the ML/AI model 32. The model file list 132, in other words, may have a byte size and/or packet count/length that is cumbersome to efficiently send via communications networks. The cybersecurity sensory agent 84, instead, may generate a file hash value 136 representing each file 134 associated with the ML/AI model 32. The cybersecurity sensory agent 84, for example, may generate the file hash values 136 using an electronic hashing algorithm (such as SHA-256) applied to the bit content representing each file 134. The cybersecurity sensory agent 84 may thus send the model file list 132 as the file hash values 136 representing the files 134 associated with the ML/AI model 32. The file hash values 136 may have a much smaller bit content and are easier/quicker to route.

The server 24 conducts the preliminary model provenance test 36. When the cloud computing environment 22 receives the request for the cybersecurity model assessment service 88, the server 24 conducts the preliminary model provenance test 36. The cybersecurity application 116, for example, may instruct the server 24 to compare the file hash values 136 to historical file hash values 138 cataloged in the database 122 of models. The database 122 of models may thus store listings of historical file hash values 138 associated with the known good/safe/permissible models 38. The database 122 of models, however, may also store the historical file hash values 138 associated with the known bad/unsafe/impermissible models 50. If the file hash values 136 match the historical file hash values 138 associated with a model 38 or 50 in the database 122 of models, then the file hash values 136 may share and inherit the same cybersecurity operational category 42 (such as the safe/normal operation 44 or the abnormal operation 46). The server 24 may thus predict that the ML/AI model 32 represents or causes the same behavioral operation 44 or 46. The server 24 may generate and send the cybersecurity prediction 92 back to the cybersecurity sensory agent 84, and the cybersecurity sensory agent 84 allows or blocks the ML/AI model 32 based on the cybersecurity prediction 92. When, however, the file hash values 136 fail the preliminary model provenance test 36 (that is, the file hash values 136 fail to match the historical file hash values 138 inventoried by the database 122 of models), the server 24 may conduct and/or coordinate the subsequent model provenance testing 40. Simply put, the server 24 may be programmed to double check, triple check, or conduct even more provenance testing 40 to ensure the ML/AI model 32 is safe to run (as later paragraphs will explain).

FIGS. 11 and 12A-12C illustrate still more examples of the preliminary model provenance test 36. Here the cybersecurity model assessment service 88 and the preliminary model provenance test 36 may use neuronal sorting 140 to assess the ML/AI model 32. When the cybersecurity sensory agent 84 is notified of the ML/AI model 32 (such as via event notifications, as previously explained), the cybersecurity sensory agent 84 may interface with its host operating system 86/104 to upload the ML/AI model 32 and/or the model provenance data 90 to the cloud computing environment 22 for the cybersecurity model assessment service 88 (as explained with reference to FIGS. 1-10).

The cybersecurity model assessment service 88 may preliminarily assess the provenance 30 using the neuronal sorting 140. When the server 24 (again illustrated as the rack server 110) reads and inspects the ML/AI model 32 and/or the model provenance data 90, the model data 32/90 may be very large and complex with billions of parameters 142 for many different uses. In general, though, the parameters 142 characterize the number/arrangement of neurons 144, the number/arrangement of layers 146, the number and values of weights 148, the number and values of biasing factors 150, and performance measures (such as the number of tokens 152 in a vocabulary corpus). Experiments have shown, though, that cyber adversaries may obfuscate ML/AI model 32, for example, by reversing the order of the neurons 144 in the layers 146. Because of how the weights 148 and the neurons 144 are structured, this obfuscation may be done without changing the behavior of the ML/AI model 32.

The cybersecurity model assessment service 88, however, may detect this obfuscation using the neuronal sorting 140. The cybersecurity application 116 may instruct the server 24 to read the parameters 142 and to sort the neurons 144 into numerical/processional order 154. The cybersecurity application 116 may additionally or alternatively instruct the server 24 to determine weight sums 156 of the weights 148 from previous and subsequent connected neurons 144. The cybersecurity application 116 may then instruct the server 24 to conduct the preliminary model provenance test 36 by comparing the neuronal sorting 140 and/or the weight sums 156 to historical neuronal sorting and historical weight sums cataloged in the database 122 of models. The database 122 of models may thus store values representing historical neuronal sorting and historical weight sums associated with the known good/safe/permissible models 38 and/or with the known bad/unsafe/impermissible models 50. If the neuronal sorting 140 and/or the weight sums 156 match, or are sufficiently similar to (perhaps using the similarity analysis 94 illustrated in FIGS. 5-9) historical observations logged in the database 122 of models, then the neuronal sorting 140 and/or the weight sums 156 may share and inherit the same cybersecurity operational category 42 (such as the safe/normal operation 44 or the abnormal operation 46). The server 24 may thus predict that the ML/AI model 32 represents or causes the same behavioral operation 44 or 46. The server 24 may thus generate the cybersecurity prediction 92 to allow or block the ML/AI model 32. Should, however, the neuronal sorting 140 and/or the weight sums 156 fail the preliminary model provenance test 36 (that is, the neuronal sorting 140 and/or the weight sums 156 fail to match or sufficiently resemble the models 38 and 50 inventoried by the database 122 of models), the server 24 may conduct and/or coordinate the subsequent model provenance testing 40. Simply put, the server 24 may conduct still more provenance testing 40 to ensure the ML/AI model 32 is safe to run (as later paragraphs will explain).

Figures 12A, 12B, 12C:
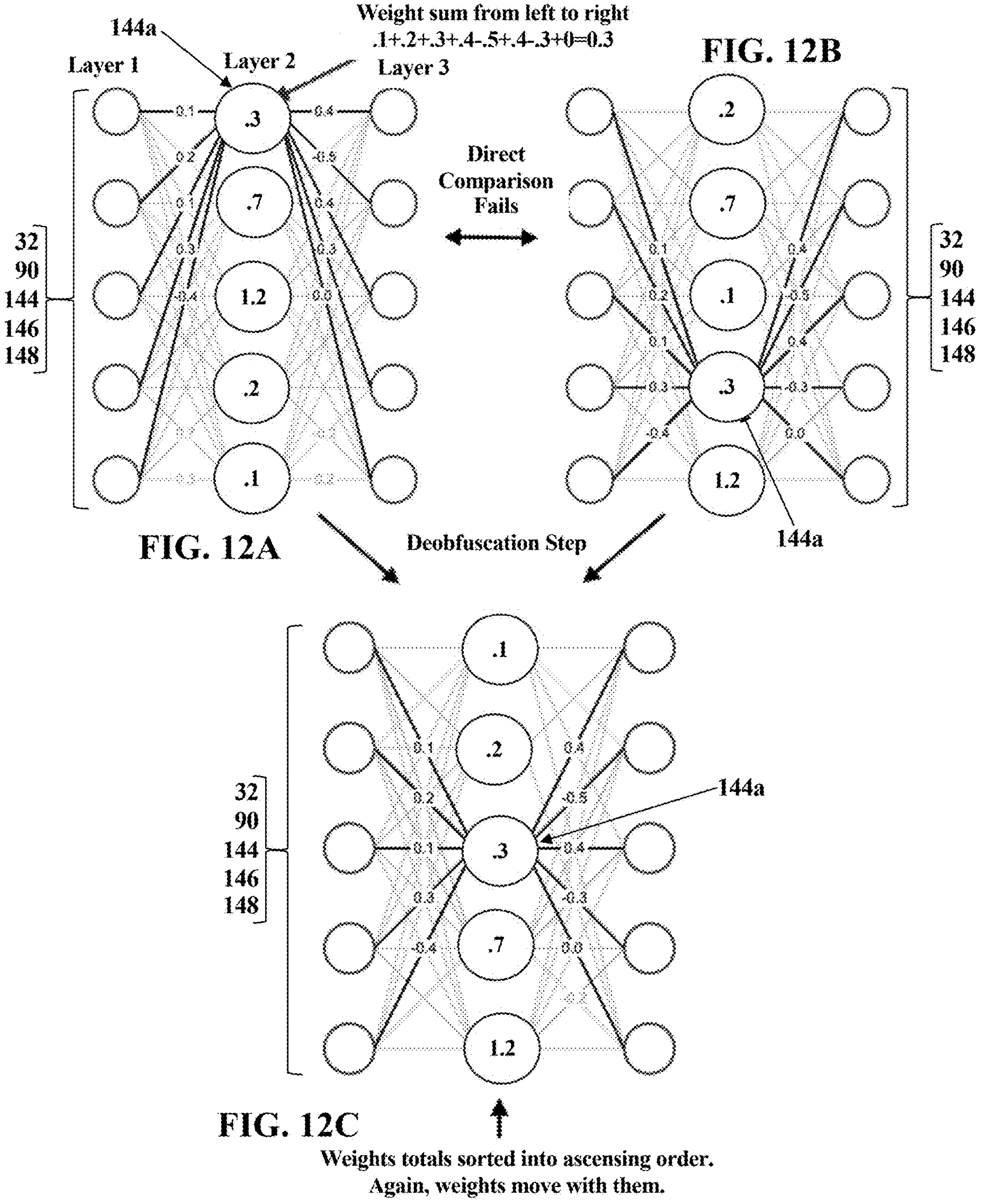

FIGS. 12A-12C illustrate more examples of deobfuscation and the neuronal sorting 140. FIGS. 12A-12C illustrates the neurons 144, the layers 146, and the weights 148 associated with the ML/AI model 32 and/or the model provenance data 90. FIG. 12A, in particular, illustrates neuron 144*a* and its connecting weights 148 to other neurons 144. In FIG. 12B, though, the ML/AI model 32 and/or the model provenance data 90 has been obfuscated. The neurons 144 associated with layer #2, for example, have been reordered to disguise the data obfuscation. A direct comparison of the weights 148 before/after obfuscation, in other words, fails and the cybersecurity threat may go undetected. Notice, though, that even though neuron 144*a* has been positionally scrambled, its connecting weights 148 also positionally move and remain constant to related neurons 144. That is, even though layer #2 has been reordered, the operational behavior remains the same. In FIG. 12C, though, the neuronal sorting 140 sorts the weight sums 156 into ascending/descending numerical order 154. By sorting layers 146 (such as layer #2) into numerical order 154 and/or into weight totals, the numerical order 154 and/or the weight totals remain constant between two parental/versional models. So, even if one or multiple layers 146 is/are scrambled, the neuronal sorting 140 and/or the weight sums 156 reveal familial lineage. If the neuronal sorting 140 and/or the weight sums 156 match, or are sufficiently similar to (perhaps using the similarity analysis 94 illustrated in FIGS. 5-9), historical observations logged in the database 122 of models, then the neuronal sorting 140 and/or the weight sums 156 may share and inherit the same cybersecurity operational category 42 (such as the safe/normal operation 44 or the abnormal operation 46). The server 24 may thus predict that the ML/AI model 32 represents or causes the same behavioral operation 44 or 46. The neuronal sorting 140 provides a single view over the networks to meaningfully do the comparison. Without the neuronal sorting 140, direct comparison fails (as showed by the weight value sums), but after the neuronal sorting 140, the cybersecurity model assessment service 88 may identify and correctly compare corresponding neurons.

The cybersecurity model assessment service 88 may thus evaluate the parameters 142. Many ML/AI/LLM models have structural and other architectural parameters 142 that are difficult to change, hide or obscure. These parameters 142, for example, include the number of layers 146 in the decoder part of the model, the sizes (number of neurons 144) within each layer 146, the tokenization scheme and number of tokens 152, and the method used for positional encoding. These parameters 142 may be relatively stable or observable with model changes (such as by adding layers of neurons that do nothing or cancel out, or tokens that are never used, or deleting layers and training further to compensate), but more significant changes would require retraining the model.

The cybersecurity model assessment service 88 may compare the model weights 148. The model weights 148 are the actual content of the ML/AI model 32, and the model weights 148 encode its learned information. The model weights 148 consist of many large numerical vectors and matrices, and as such the weights 148 of two models can be compared with each other. The weights 148 of two models do not have to agree precisely for them to do the same thing, as shown by quantized models (where numerical precision is reduced) that perform similarly to non-quantized versions. Likewise for fine-tuned models, where weights 148 will have been adjusted slightly by the fine-tuning process. But the weights 148 of two models that are essentially the same, or where one is based on the other or have a common parent, will be similar. So, the similarity 94 may be shown if normalized weights ranging −1 to +1 were, say, within 0.01 of each other when averaged over the whole model.

Figure 13:
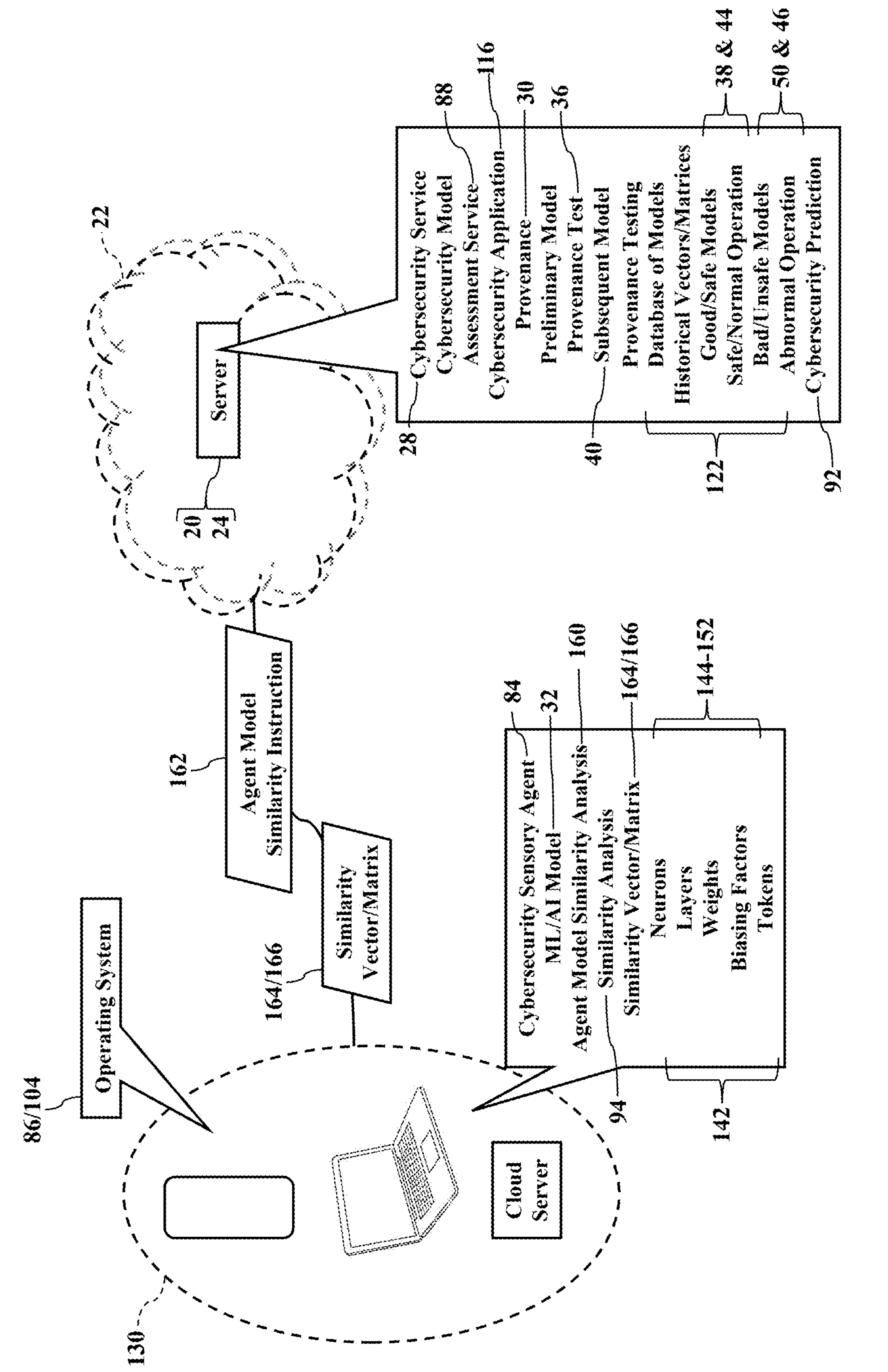
FIGS. 13-16 illustrate examples of the cybersecurity model assessment service and subsequent model provenance testing.

FIGS. 13-16 illustrate examples of the cybersecurity model assessment service 88 and the subsequent model provenance testing 40. If the ML/AI model 32 fails the preliminary model provenance test 36, then the provenance 30 is at least preliminarily indeterminate. The cybersecurity model assessment service 88 may therefore conduct the subsequent model provenance testing 40 to further assess the provenance 30 of the ML/AI model 32. Suppose, for example, that the cybersecurity model assessment service 88 instructs the cybersecurity sensory agent 84 to execute an agent model similarity analysis 160. When the ML/AI model 32 fails the preliminary model provenance test 36, for example, in response, the cybersecurity application 116 may be configured to generate and send an agent model similarity instruction 162 via the cloud computing environment 22 to the cybersecurity sensory agent 84 installed at the client device 130. The agent model similarity instruction 162 instructs the cybersecurity sensory agent 84 to locally execute the agent model similarity analysis 160. The cybersecurity sensory agent 84 may thus have programming code or a module that cooperates with the host's operating system 86/104 to run the agent model similarity analysis 160 using data associated with the ML/AI model 32. The cybersecurity sensory agent 84, for example, conducts the similarity analysis 94 and generates similarity vectors 164, and/or similarity matrices 166, using one, some, or all of the model parameters 142 (such as the neurons 144, layers 146, weights 148 and/or others) associated with the ML/AI model 32. The cybersecurity sensory agent 84 may then cooperate with the host's operating system 86/104 to send the similarity vectors/matrices 164/166 to the cybersecurity model assessment service 88 for analysis. Again, for simplicity, FIG. 13 illustrates the server 24 receiving the similarity vectors/matrices 164/166.

The server 24 may then compare the similarity vectors/matrices 164/166. The server 24 resumes the cybersecurity model assessment service 88 by comparing the similarity vectors/matrices 164/166 to historically known similarity vectors and/or matrices cataloged in the database 122 of models. The database 122 of models may thus store historical similarity vectors/matrices 164/166 that are associated with the known good/safe/permissible models 38 and/or with the known bad/unsafe/impermissible models 50. The database 122 of models may further associate each model 38 and 50 with its corresponding minimum similarity threshold value. The cybersecurity application 116 may thus instruct the server 24 to compare the similarity vectors/matrices 164/166 (generated by and sent from the cybersecurity sensory agent 84) to the historically known similarity vectors and/or matrices indexed by the database 122 of models. If the similarity vectors/matrices 164/166 (associated with the ML/AI model 32) sufficiently match at least one of the historically known similarity vectors/matrices registered by the database 122 of models, then the ML/AI model 32 may share and inherit the same cybersecurity operational category 42 (such as the safe/normal operation 44 or the abnormal operation 46). The similarity vectors/matrices 164/166 (associated with the ML/AI model 32), as examples, may have similarity values that equal or exceed the minimum similarity threshold value associated with one of the historically known good/bad models 38/50. The server 24 may thus predict that the ML/AI model 32 represents or causes the same behavioral operation 44 or 46. The server 24 may generate and send the cybersecurity prediction 92 back to the cybersecurity sensory agent 84, and the cybersecurity sensory agent 84 allows or blocks the ML/AI model 32 based on the cybersecurity prediction 92 (as illustrated with reference to FIGS. 5-6 and 8-10). The cybersecurity model assessment service 88 may thus conduct and/or coordinate the subsequent model provenance testing 40 to ensure the ML/AI model 32 is safe or unsafe to run.

Figure 14:
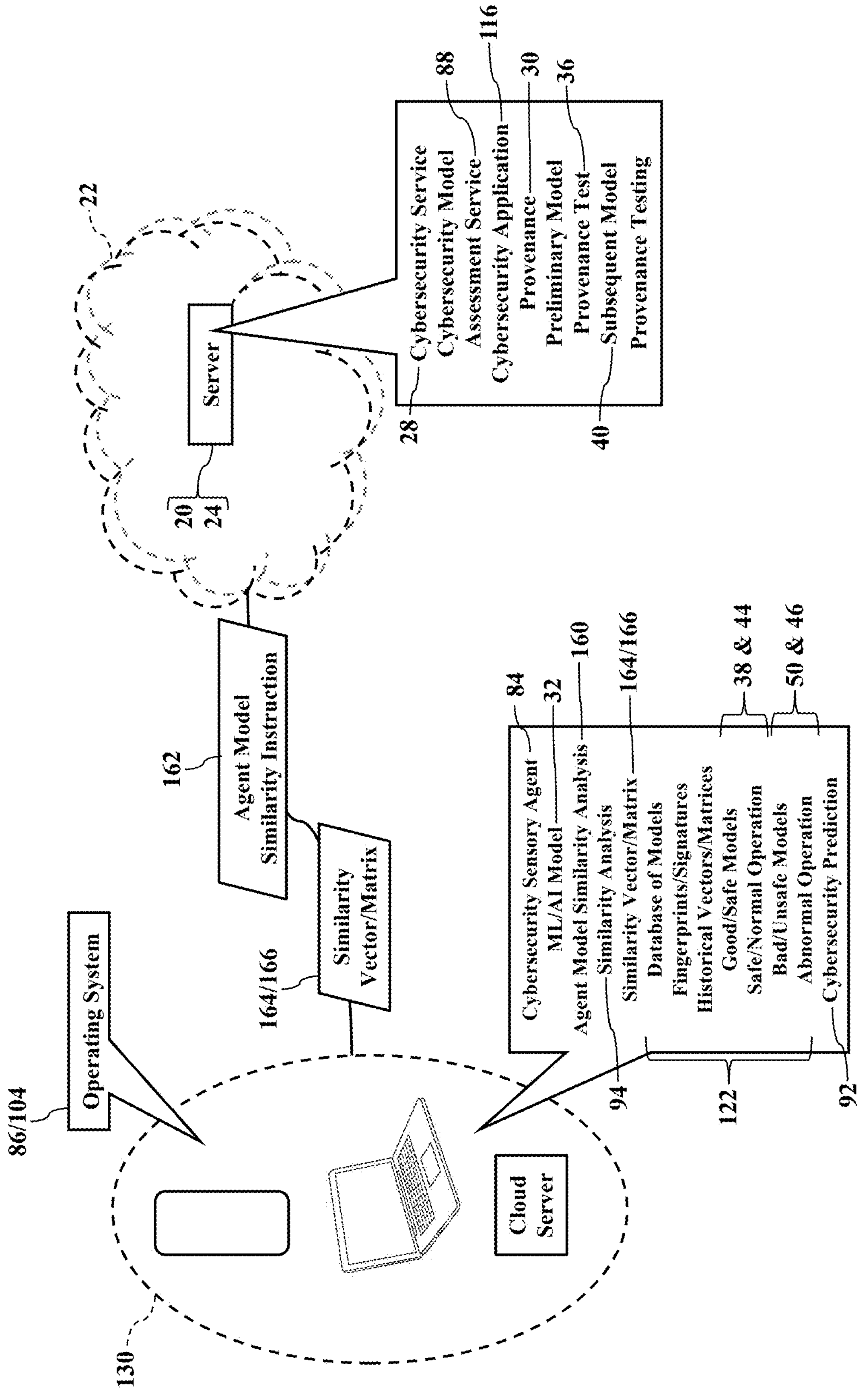

FIG. 14 illustrates more examples of the cybersecurity model assessment service 88 and the subsequent model provenance testing 40. Here the cybersecurity sensory agent 84 may locally execute more features of the agent model similarity analysis 160. If the cybersecurity sensory agent 84 generates the similarity vectors/matrices 164/166 associated with the ML/AI model 32, then the cybersecurity sensory agent 84 may locally compare the similarity vectors/matrices 164/166 to locally-stored model fingerprints/signatures. The cybersecurity sensory agent 84, for example, may locally access a client-side version of the database 122 of models. The cybersecurity sensory agent 84 may thus cooperate with the host operating system 86/104 to download and locally store some or perhaps all of the data records associated with the database 122 of models. The cybersecurity sensory agent 84, for example, may query the database 122 of models for values representing the similarity vectors/matrices 164/166 associated with the ML/AI model 32. If the similarity vectors/matrices 164/166 (associated with the ML/AI model 32) sufficiently match at least one of the historically known similarity vectors/matrices registered by the client-side version of the database 122 of models, then the ML/AI model 32 may share and inherit the same cybersecurity operational category 42 (such as the safe/normal operation 44 or the abnormal operation 46). The cybersecurity sensory agent 84, for example, may calculate the similarity values 94 associated with the similarity vectors/matrices 164/166 and compare the similarity values 94 to the minimum similarity threshold values associated with the historically known similarity vectors/matrices registered by the client-side version of the database 122 of models. The cybersecurity sensory agent 84 may thus predict the same behavioral operation 44 or 46, based on the similarity analysis 94. The cybersecurity sensory agent 84 may thus allow or block the ML/AI model 32 based on the cybersecurity prediction 92. The cybersecurity sensory agent 84 may thus conduct the subsequent model provenance testing 40 to ensure the ML/AI model 32 is safe or unsafe to run.

The cybersecurity sensory agent 84 may lack sharing permissions. When the host's operating system 86/104 notifies the cybersecurity sensory agent 84 of the ML/AI model 32, the cybersecurity sensory agent 84 may be prohibited from revealing model data associated with the ML/AI model 32. A customer or user of the client device 130, for example, may deny sharing/uploading/communicating data representing the ML/AI model 32 or the model provenance data 90 (such as the model file lists 132, the file hash values 136, the model parameters 142, and/or the similarity values/vectors/matrices 94/164/166). Simply put, the cybersecurity sensory agent 84 may lack permission or authorization to request remote portions of the cybersecurity model assessment service 88. The cybersecurity sensory agent 84 may thus be limited to only conducting the agent model similarity analysis 160. If the agent model similarity analysis 160 fails, though, the user/customer would be reliant on alternative model assessment schemes. The cybersecurity sensory agent 84, however, may be configured to terminate processing of the ML/AI model 32.

Figure 15:
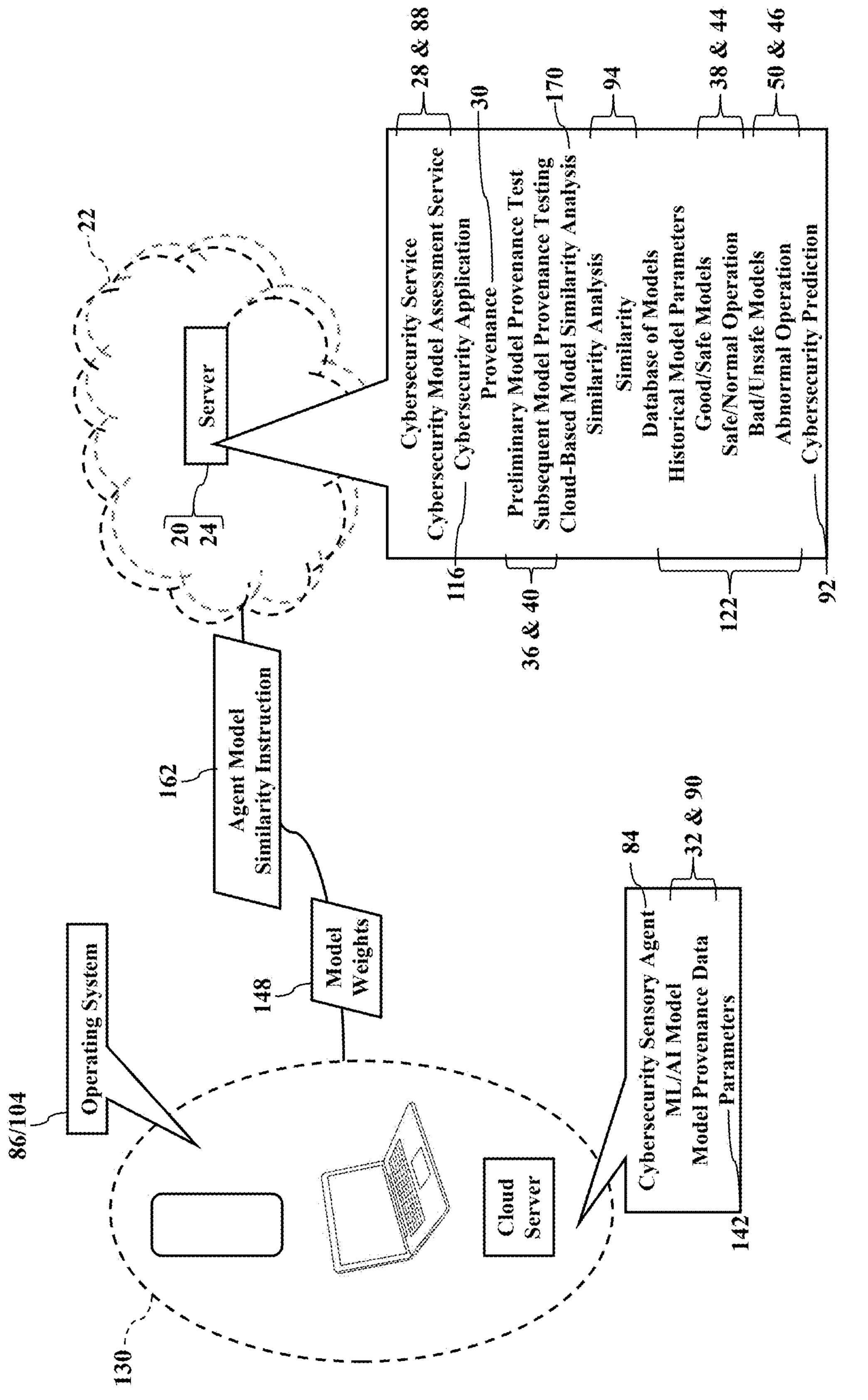

FIG. 15 illustrates still more examples of the cybersecurity model assessment service 88 and the subsequent model provenance testing 40. If the subsequent model provenance testing 40 remains inconclusive (that is, the ML/AI model 32 cannot be predicted as normal operation 44 or abnormal operation 46 after performing the preliminary model provenance test 36 and the agent model similarity analysis 160 illustrated in FIGS. 13-14), still more subsequent model provenance testing 40 may be conducted. In FIG. 15, for example, the cybersecurity model assessment service 88 may conduct a cloud-based model similarity analysis 170. The cybersecurity sensory agent 84, for example, may cooperate with the cooperate host operating system 86/104 to upload the entire ML/AI model 32, or the reduced model provenance data 90, to the cybersecurity model assessment service 88. The agent model similarity instruction 162, as a simple example, may cause the client device 130 to send some or all of the model parameters 142 (such as the model weights 148) to the cybersecurity model assessment service 88 (such as performed by the server 24). The cybersecurity application 116 may then instruct the server 24 to perform the similarity analysis 94 and to determine the similarity between the parameters 142 to historical model parameters cataloged in the database 122 of models. The database 122 of models may thus store values representing many historical parameters associated with the known good/safe/permissible models 38 and/or with the known bad/unsafe/impermissible models 50. Again, the similarity analysis 94 may utilize whatever similarity algorithm/algorithms that is/are desired to achieve performance, cost, or other goals. Whichever similarity analysis 94 is/are used, the similarity analysis 94 may compare some or all of the current/historical parameters. If the model parameters 142 match, or are sufficiently similar to (perhaps according to the minimum similarity threshold value), the historical model parameters in the database 122 of models, then the model parameters 142 may share and inherit the same cybersecurity operational category 42 (such as the safe/normal operation 44 or the abnormal operation 46). The server 24 may thus predict that the ML/AI model 32 represents or causes the same behavioral operation 44 or 46. The server 24 may generate and send the cybersecurity prediction 92 back to the cybersecurity sensory agent 84, and the cybersecurity sensory agent 84 allows or blocks the ML/AI model 32 based on the cybersecurity prediction 92 (as illustrated with reference to FIGS. 5-6 and 8-10). The cybersecurity model assessment service 88 may thus conduct and/or coordinate the subsequent model provenance testing 40 to ensure the ML/AI model 32 is safe or unsafe to run. Should, however, the cloud-based model similarity analysis 170 fail the preliminary model provenance test 36 (that is, the model parameters 142 fail to match or sufficiently resemble the historical model parameters in the database 122 of models), the server 24 may conduct and/or coordinate additional subsequent model provenance testing 40. Simply put, the server 24 may conduct still more model provenance testing 40 to ensure the ML/AI model 32 is safe to run.

Figure 16:
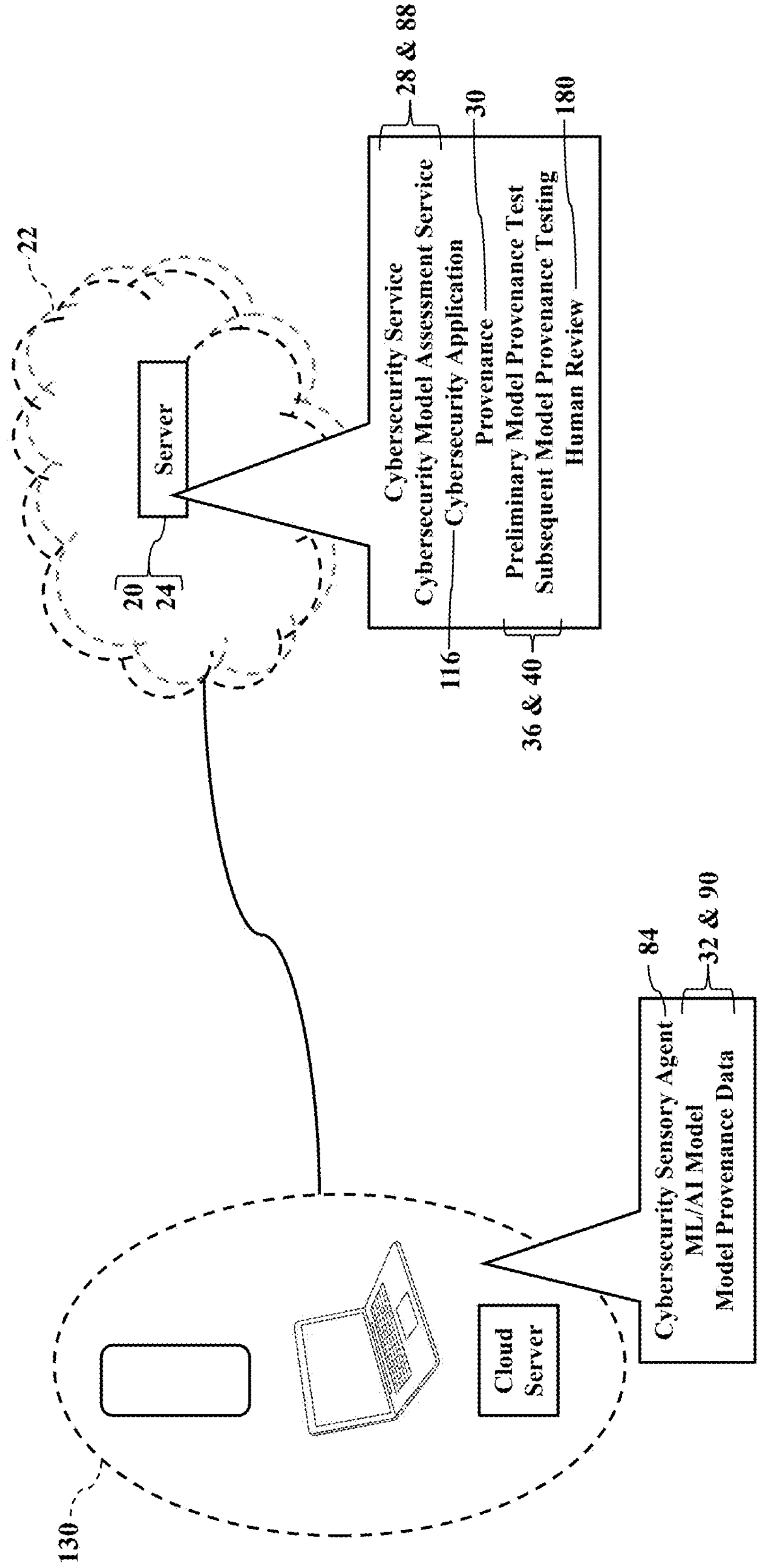

FIG. 16 illustrates still more examples of the cybersecurity model assessment service 88 and the subsequent model provenance testing 40. If the ML/AI model 32 fails the preliminary model provenance test 36, and the ML/AI model 32 exhausts or fails the subsequent model provenance testing 40, then the cybersecurity model assessment service 88 may escalate a human review 180. The cybersecurity model assessment service 88 may sequentially or serially perform as many of the subsequent model provenance testing 40 as desired. At some time, though, the cybersecurity model assessment service 88 may be configured to stop/halt/terminate the subsequent model provenance testing 40. Repeated failures of the subsequent model provenance testing 40, for example, may be configured or determined as futile, so the human review 180 is queued. Because the preliminary model provenance test 36, and the subsequent model provenance testing 40, are inconclusive, the cybersecurity application 116 may instruct the server 24 to determine the ML/AI model 32 qualifies for the human review 180. The cybersecurity model assessment service 88 thus hands off the ML/AI model 32 to human cybersecurity experts to determine the provenance 30. The human cybersecurity experts may thus determine if the cybersecurity model assessment service 88 is operationally failing, or if the ML/AI model 32 is newly discovered and needs classifying or naming.

Figure 17:
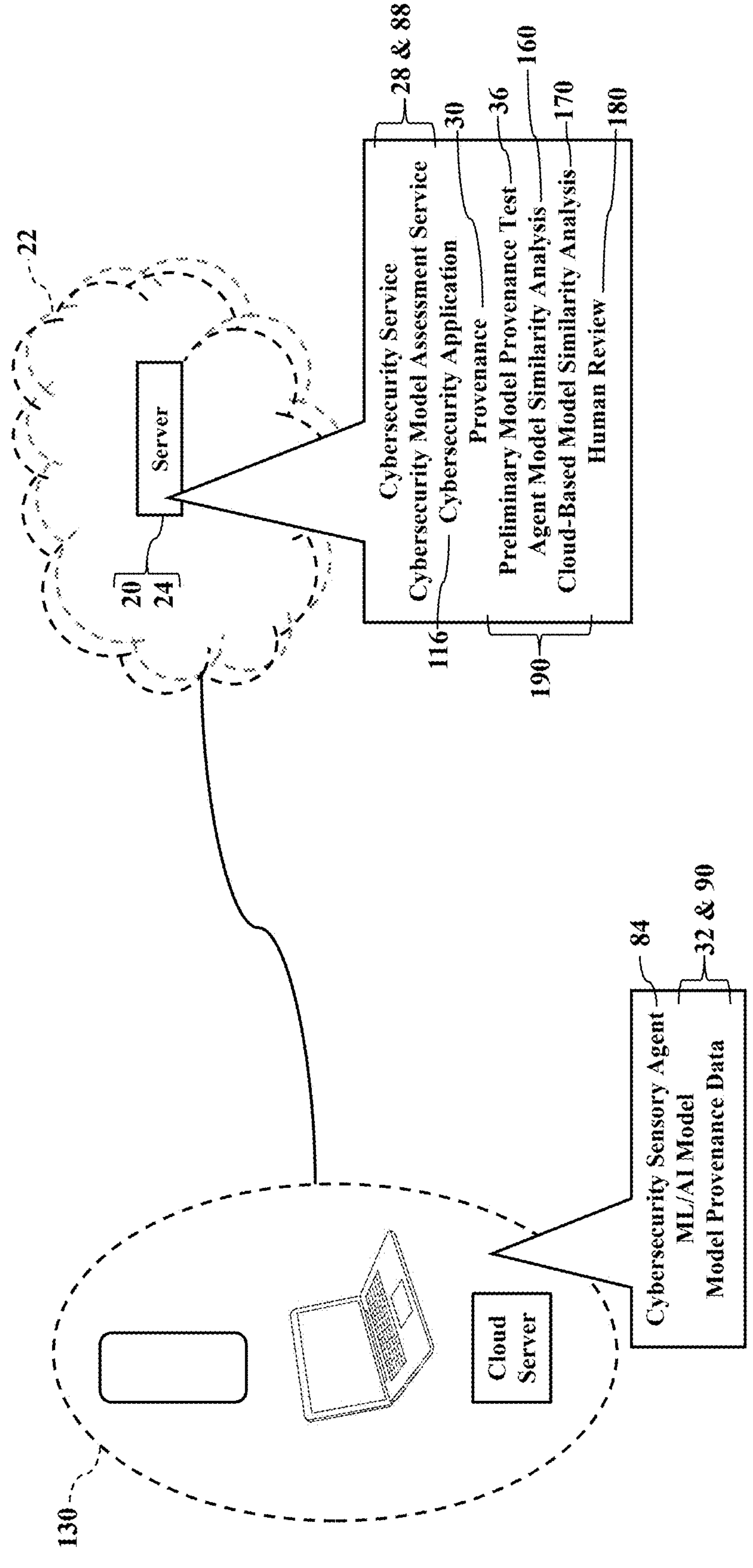
FIG. 17 illustrates examples of sequential model provenance testing.

FIG. 17 illustrates yet more examples of the cybersecurity model assessment service 88. The cybersecurity model assessment service 88 determines the provenance 30 of the ML/AI model 32 by conducting one or more model provenance tests (such as the preliminary model provenance test 36 and the subsequent model provenance testing 40). The cybersecurity model assessment service 88, however, may be configured to determine the provenance 30 according to a model provenance test sequence 190. The cybersecurity model assessment service 88, in other words, may sequentially/serially execute the model provenance tests. The cybersecurity model assessment service 88, for example, may commence step 1 of the model provenance test sequence 190 by first conducting the preliminary model provenance test 36 (such as by using the file hash values 136 and/or by using the neuronal sorting 140, as explained with reference to FIGS. 10-12). If the preliminary model provenance test 36 fails, then the provenance 30 of the ML/AI model 32 is preliminarily inconclusive. The cybersecurity model assessment service 88 may then commence step 2 in the model provenance test sequence 190 by conducting the agent model similarity analysis 160 (as explained with reference to FIGS. 13-14). If the agent model similarity analysis 160 fails (that is, the provenance 30 remains inconclusive), the cybersecurity model assessment service 88 may next commence step 3 in the model provenance test sequence 190 by conducting and executing the cloud-based model similarity analysis 170 (as explained with reference to FIG. 15). If the cloud-based model similarity analysis 170 fails (again, the provenance 30 remains inconclusive), the cybersecurity model assessment service 88 may next commence step 4 in the provenance test sequence 190 by flagging or designating the ML/AI model 32 for the human review 180 (as explained with reference to FIG. 16). The cybersecurity model assessment service 88 may thus determine the provenance 30 by sequentially/serially executing the model provenance tests.

Interestingly, the cybersecurity model assessment service 88 may begin by conducting the cloud-based model similarity analysis 170. That is, the cybersecurity model assessment service 88 may skip the preliminary model provenance test 36 and the agent model similarity analysis 170. If the cybersecurity model assessment service 88 has network access to the source or origin (e.g., URL) of the ML/AI model 32, then the cybersecurity model assessment service 88 may download the full byte content representing the ML/AI model 32 or the reduced byte content representing the model provenance data 90. The cybersecurity model assessment service 88 may then begin assessing the provenance 30 by conducting the cloud-based model similarity analysis 170 (as explained with reference to FIG. 15). If the cloud-based model similarity analysis 170 fails (again, the provenance 30 remains inconclusive), the cybersecurity model assessment service 88 may nearly immediately flag or designate the ML/AI model 32 for the human review 180 (as explained with reference to FIG. 16).

Figure 18:
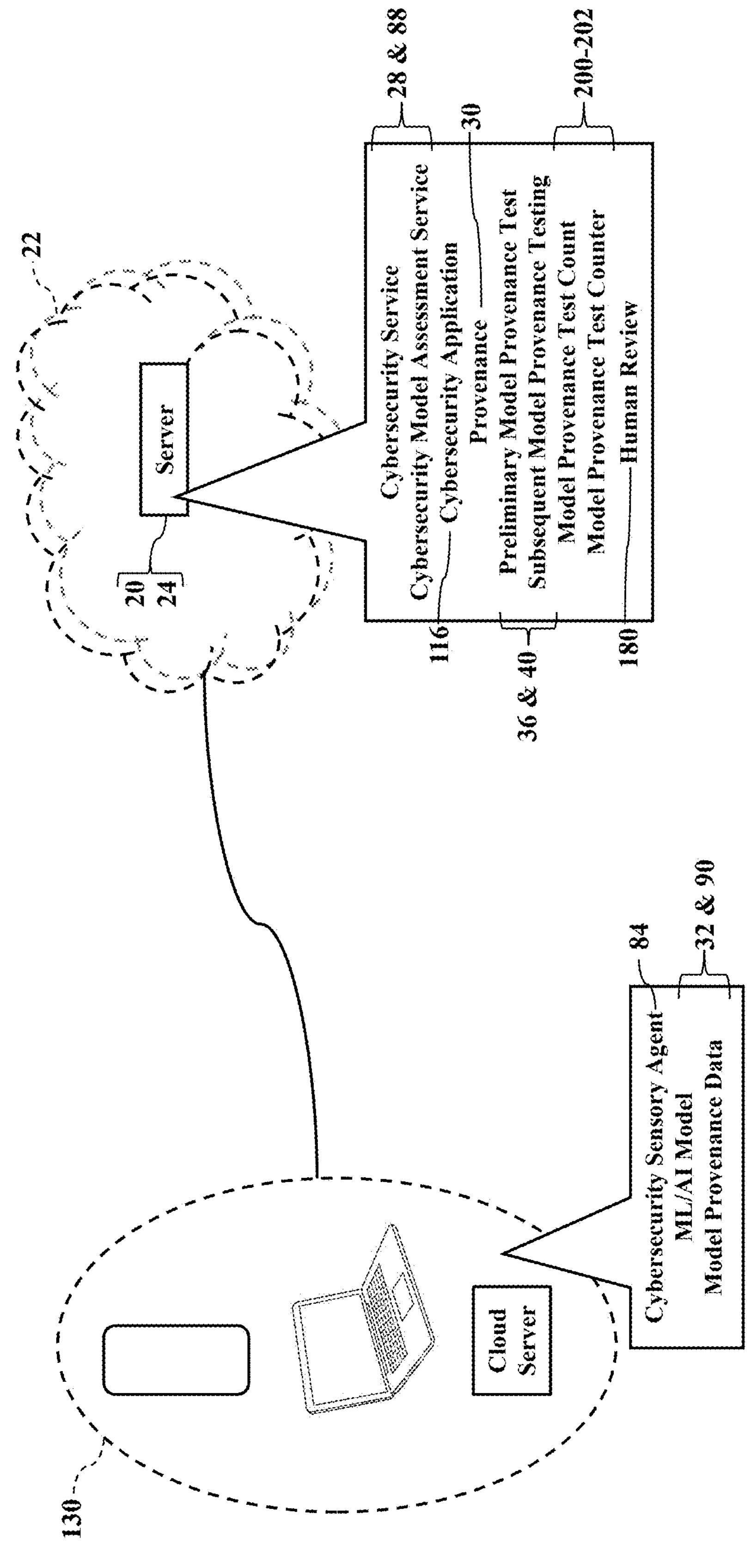
FIG. 18 illustrates examples of numerically counting model provenance testing.

FIG. 18 illustrates yet more examples of the cybersecurity model assessment service 88. The cybersecurity model assessment service 88 determines the provenance 30 of the ML/AI model 32 by conducting one or more model provenance tests. The cybersecurity model assessment service 88, for example, may be configured to first determine the provenance 30 by conducting the preliminary model provenance test 36 (as explained with reference to FIGS. 10-12). If the preliminary model provenance test 36 fails, then the provenance 30 of the ML/AI model 32 is preliminarily inconclusive. The cybersecurity model assessment service 88 may then conduct one or more rounds of the subsequent model provenance testing 40 (as explained with reference to FIGS. 13-15). Indeed, the cybersecurity model assessment service 88 may be configured to conduct as many of the model provenance tests as desired. The cybersecurity model assessment service 88, however, may be configured to stop or halt the subsequent model provenance testing 40 according to a maximum model provenance test count 200. That is, when cybersecurity model assessment service 88 commences the model provenance tests (such as the preliminary model provenance test 36), the cybersecurity application 116 may instruct the server 24 to establish or initialize a model provenance test counter 202 that increments from an initial value (such as zero) to a final value. As the cybersecurity model assessment service 88 commences or completes each different model provenance test (such as the preliminary model provenance test 36 or the subsequent model provenance testing 40), the cybersecurity application 116 may instruct the server 24 to increment the model provenance test counter 202. When the current value equals the maximum model provenance test count 200, then the cybersecurity application 116 may instruct the server 24 to terminate further provenance testing. So, if the model provenance test counter 202 increments to the final, maximum model provenance test count 200, and the provenance 30 remains inconclusive, then the cybersecurity model assessment service 88 may be configured to flag or designate the ML/AI model 32 for the human review 180.

Figure 19:
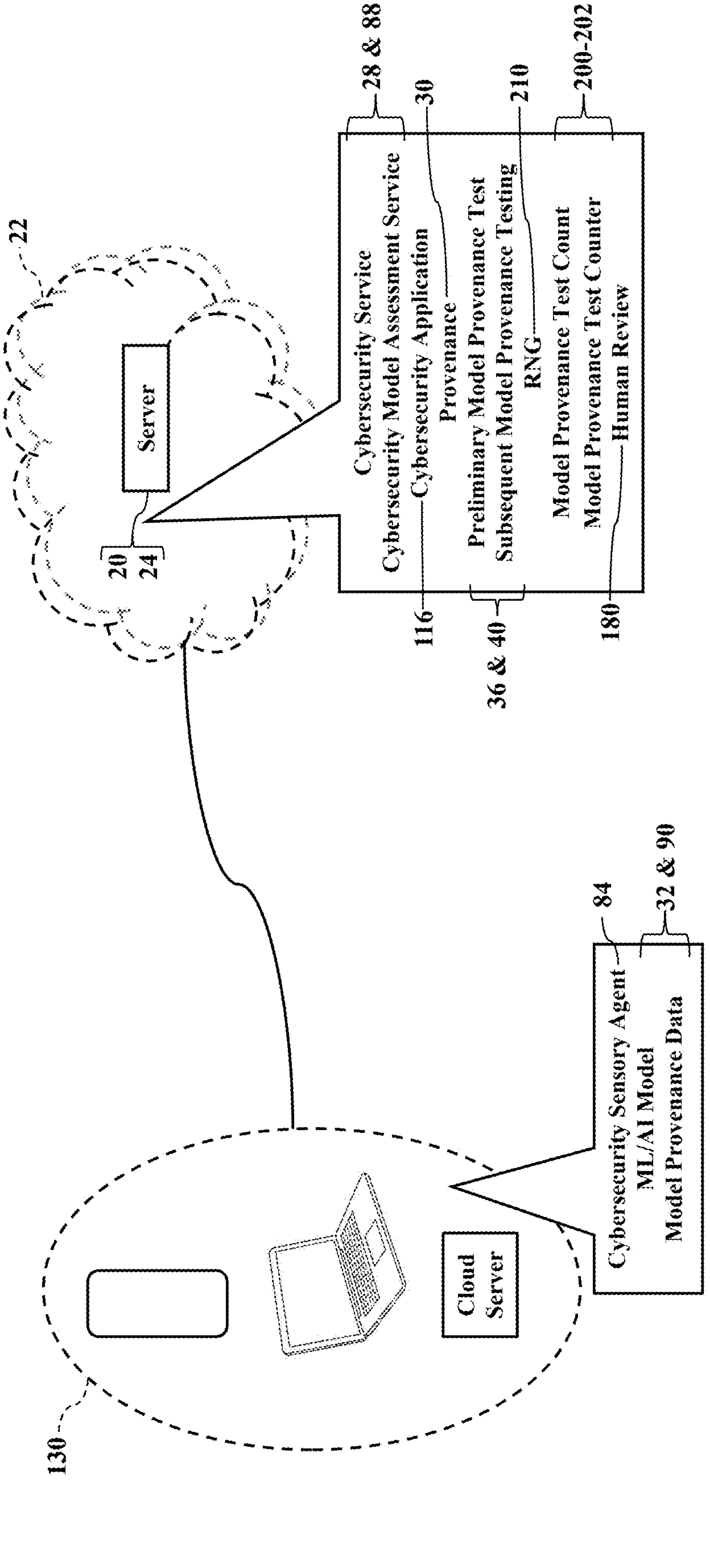
FIG. 19 illustrates examples of random model provenance testing to avoid obfuscation.

FIG. 19 illustrates even more examples of the cybersecurity model assessment service 88. In these examples, the cybersecurity model assessment service 88 determines the provenance 30 of the ML/AI model 32 by randomly conducting one or more of the model provenance tests. The cybersecurity model assessment service 88, for example, may be configured to first select one of the model provenance tests using a random number generator (or RNG) 210. Suppose, for example, that the cybersecurity model assessment service 88 offers many different model provenance tests (such as the model provenance tests explained with reference to FIGS. 10-16). The cybersecurity model assessment service 88 may randomly select a first one of different model provenance tests by using the random number generator 210. If the provenance 30 of the ML/AI model 32 is inconclusive after executing the first one of the different model provenance tests, then the cybersecurity model assessment service 88 may randomly select a second one of different model provenance tests again by using the random number generator 210. The cybersecurity model assessment service 88, however, may remove or eliminate the first model provenance test from consideration, as the first model provenance test failed. The cybersecurity model assessment service 88 executes the second model provenance test and assesses the provenance 30. If the provenance 30 of the ML/AI model 32 remains inconclusive after executing the second model provenance test, then the cybersecurity model assessment service 88 may randomly select and execute a third one of different model provenance tests (again, perhaps after removing the second model provenance test from contention). The cybersecurity model assessment service 88 may continue assessing the provenance 30 in like fashion, randomly using whichever model provenance tests remain in consideration. The cybersecurity model assessment service 88 may continue assessing the provenance 30 until all the model provenance tests have failed and been exhausted. The cybersecurity model assessment service 88, however, may be configured to terminate further random provenance testing when the model provenance test counter 202 increments to the final, maximum model provenance test count 200 (as explained with reference to FIG. 18). However the cybersecurity model assessment service 88 terminates further provenance testing, if the provenance 30 remains inconclusive, then the cybersecurity model assessment service 88 may be configured to flag or designate the ML/AI model 32 for the human review 180.

Computer functioning is greatly improved. Malicious software can ruin computer operations. The server 24 and/or the cybersecurity sensory agent 84 quickly identify/identifies suspicious/malicious ML/AI models to minimize damage to the client devices 130. Because the cybersecurity model assessment service 88 determines the provenance 30, the cybersecurity model assessment service 88 quickly and simply stops computer systems from executing suspicious/malicious ML/AI models. The cybersecurity model assessment service 88 thus greatly improves computer functioning by detecting abnormal/harmful ML/AI models.

Figure 20:
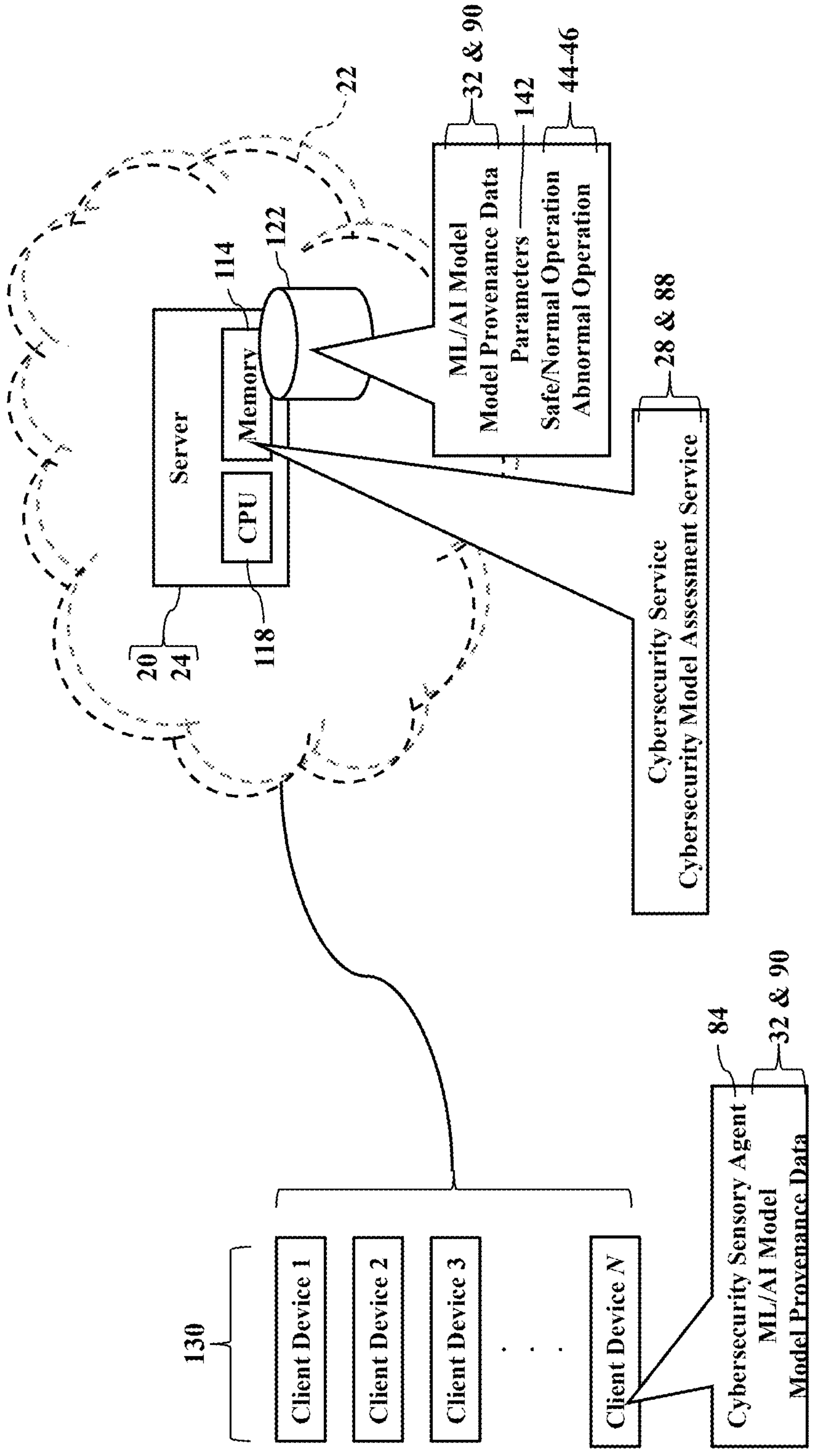
FIGS. 20-21 illustrate more examples of the cybersecurity model assessment service.
Figure 21:
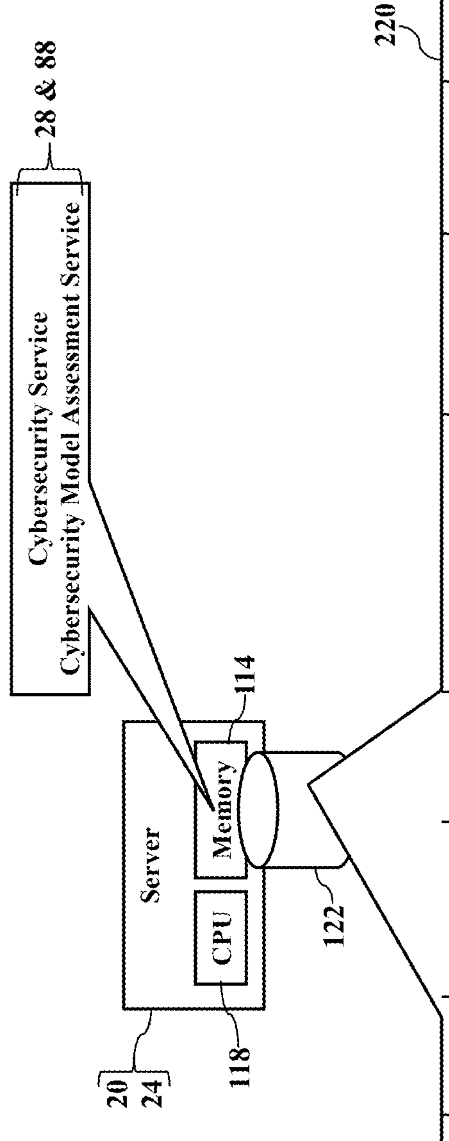

FIGS. 20-21 illustrate more examples of the cybersecurity model assessment service 88. As this disclosure above explained, machine learning and artificial intelligence are growing in use. More and more client devices 130, in other words, will encounter the ML/AI model 32 and request the cybersecurity model assessment service 88. Because the client computing environment 22 and the cybersecurity model assessment service 88 may serve millions of client devices 130, each day the cloud computing environment 22 may receive thousands of requests to assess different ML/AI models. Over time, then, the cybersecurity model assessment service 88 will have assessed many different ML/AI models and labeled/classified/categorized their corresponding computer activities, behaviors, context, and usage (such as the cybersecurity operational categories 42 of safe/normal operation 44 or the abnormal operation 46). The cybersecurity model assessment service 88 thus leverages this rich and extensive cybersecurity knowledge to protect the client devices 130 from cybersecurity threats (such as abnormal/harmful ML/AI models).

The cybersecurity model assessment service 88 may thus retain service records. As the cybersecurity model assessment service 88 scrutinizes each different ML/AI model 32, the cybersecurity model assessment service 88 comprehensively stores and logs the details of each ML/AI model 32. The cybersecurity model assessment service 88, for example, logs the model provenance data 90, the model file lists 132, the file hash values 136, the model parameters 142, the similarity values/vectors/matrices 94/164/166, the results or notes of the human review 180, and the final assessment of safe/normal operation 44 or the abnormal operation 46. The cybersecurity model assessment service 88 may thus retain vast amounts of institutional cybersecurity knowledge developed over days/weeks/months/years by analyzing and assessing many different ML/AI models. The cybersecurity model assessment service 88 may thus implement a network architecture or component that represents this historical cybersecurity expertise. FIGS. 20-21, for example, illustrate the networked, electronic database 122 of models. The electronic database 122 of models stores electronic records of each ML/AI model 32.

The cybersecurity model assessment service 88 maintains a rich repository of historical cybersecurity model knowledge. As the cloud computing environment 22 receives and assesses many different ML/AI models, the cloud computing environment 22 may collect and store records associated with each ML/AI model 32. While the database 122 of models may be remotely stored and accessed/queried via the cloud computing environment 22, for simplicity FIGS. 20-21 illustrate the electronic database 122 of models as being locally stored in the memory device 114 of the server 24. Even though the electronic database 122 of models may have other logical structures, a relational database is perhaps easiest to understand. FIG. 21 thus illustrates the electronic database 122 of models as a table 220 having row and columnar database entries that map, relate, convert, or associate each different ML/AI model 32 to its corresponding model data (such as the model provenance data 90, the model file lists 132, the file hash values 136, the model parameters 142, the similarity values/vectors/matrices 94/164/166, the results or notes of the human review 180, and the final assessment of safe/normal operation 44 or the abnormal operation 46). As the cybersecurity model assessment service 88 assesses each ML/AI model 32, the cybersecurity model assessment service 88 may add database entries that log the model data. The cybersecurity model assessment service 88 may also log, and/or assign, one or more timestamps to the service records. Moreover, if the ML/AI model 32 was scrutinized by a human cybersecurity expert analyst, the electronic database 122 may further log and identify the name/identifier of the human cybersecurity expert analyst and his/her/their human analyst review 180. The electronic database 122 may log notes or analysis used/applied by the human cybersecurity expert analyst(s). So, when the cybersecurity model assessment service 88 receives and evaluates a current or new ML/AI model 32, the cybersecurity model assessment service 88 may query the electronic database 122 and identify and/or retrieve any matching or similar historically-assessed model data. If a matching database entry is determined, then the cybersecurity model assessment service 88 may identify and/or retrieve any corresponding columnar/row entries. The cybersecurity model assessment service 88 may thus execute quick and simple database lookups to determine the provenance 30.

The cybersecurity model assessment service 88 thus leverages this rich and extensive model knowledge. The electronic database 122, as a simple example, may be tapped to train a cybersecurity assessment model that uses machine learning and/or artificial intelligence to assess the ML/AI model 32. The cybersecurity application 116, for example, may retrieve any of the database entries and apply the database entries as cybersecurity training data. The machine-learned cybersecurity model assessment service 88 may thus generate model profiles that statistically describe each ML/AI model 32 and its operational behavior (such as safe/normal operation 44 or the abnormal operation 46). So, when the cybersecurity model assessment service 88 inspects and assesses the ML/AI model 32, the machine-learned cybersecurity model assessment service 88 accurately predicts the operational behavior. The cybersecurity model assessment service 88 reflects vast amounts of institutional cybersecurity knowledge.

The cybersecurity model assessment service 88 may thus determine the history, provenance 30, and any base models that a particular ML/AI model 32 was constructed from. The cybersecurity model assessment service 88 assesses the provenance 30 even after the ML/AI model 32 has been fine-tuned (such as introducing small changes to some or all of the model weights 148) or obfuscated (by rearranging the internals of the ML/AI model 32 but not changing its fundamental performance). The cybersecurity model assessment service 88 also assesses the provenance 30 without requiring inference, i.e. without deploying the ML/AI model 32 and using it to make predictions.

The cybersecurity model assessment service 88 determines the provenance 30 of the ML/AI model 32. The cybersecurity model assessment service 88 conducts one or more model provenance tests (such as the preliminary model provenance test 36 and the subsequent model provenance testing 40). Additional model provenance tests, for example, may recover the model weights 148 before they were fine-tuned, as described by Horwitz, et al., Recovering the Pre-Fine-Tuning Weights of Generative Models, School of Computer Science and Engineering, The Hebrew University of Jerusalem, Israel (2024), and incorporated herein by reference in its entirety. More model provenance tests, for example, may compare the embedding sections of the ML/AI model 32, which convert between tokens and vectors, by directly comparing generated vectors. Still more model provenance tests, for example, may include tree recovery techniques using MoTHer Recovery, as described by Horwitz, et al., On the Origins of Llamas: Model Tree Heritage Recovery, School of Computer Science and Engineering, The Hebrew University of Jerusalem, Israel (2024), and incorporated herein by reference in its entirety. MoTHer Recovery attempts to recover model heritage from the weights 148 alone, but MoTHer Recovery fails to mention and overcome obfuscation techniques. Still more model provenance tests, for example, may use fuzzy hashing (such as https://en.wikipedia.org/wiki/Fuzzy_hashing) for file comparison, and used to determine whether data is similar when it is not identical. The cybersecurity model assessment service 88 may apply fuzzy hashing, for example, to the model weights 148. Still more model provenance tests, for example, may use specialized techniques for Mixture of Experts models, involving similarity at the matrix, neuron and gate levels as described by Lo, et al., A Closer Look into Mixture-of-Experts in Large Language Models, available at https://arxiv.org/abs/2406.18219 (2024) (accessed September 2024).

The cybersecurity model assessment service 88 may generate and compare digital fingerprints of ML/AI models. The cybersecurity model assessment service 88, for example, may generate the unique fingerprint as a small quantity of data (perhaps a few tens or hundreds of values) that is derived from each ML/AI model 32 (or other source item) that identifies it. Some types of fingerprints (such as, for example, public key fingerprints (https://en.wikipedia.org/wiki/Public_key_fingerprint) identify the exact source item, in that the fingerprint changes radically with even a slight modification of the source. Other fingerprints, though, stay largely the same as small modifications are made to the source, and only change radically when large changes are made. The cybersecurity model assessment service 88, however, may implement both types of fingerprints in order to classify two different models as identical, somewhat related, or unrelated, and maybe even a measure of how related two models are. The cybersecurity model assessment service 88 may thus use a combination of more than one fingerprint type to assess the provenance 30 of the ML/AI model 32.

As this disclosure shows, the cybersecurity model assessment service 88 may conduct multiple, different model provenance tests. The cybersecurity model assessment service 88 may assess the provenance 30 of the ML/AI model 32 using a combination of more than one model provenance tests, so that a malicious model that successfully evaded one would likely be caught by another.

Figure 22:
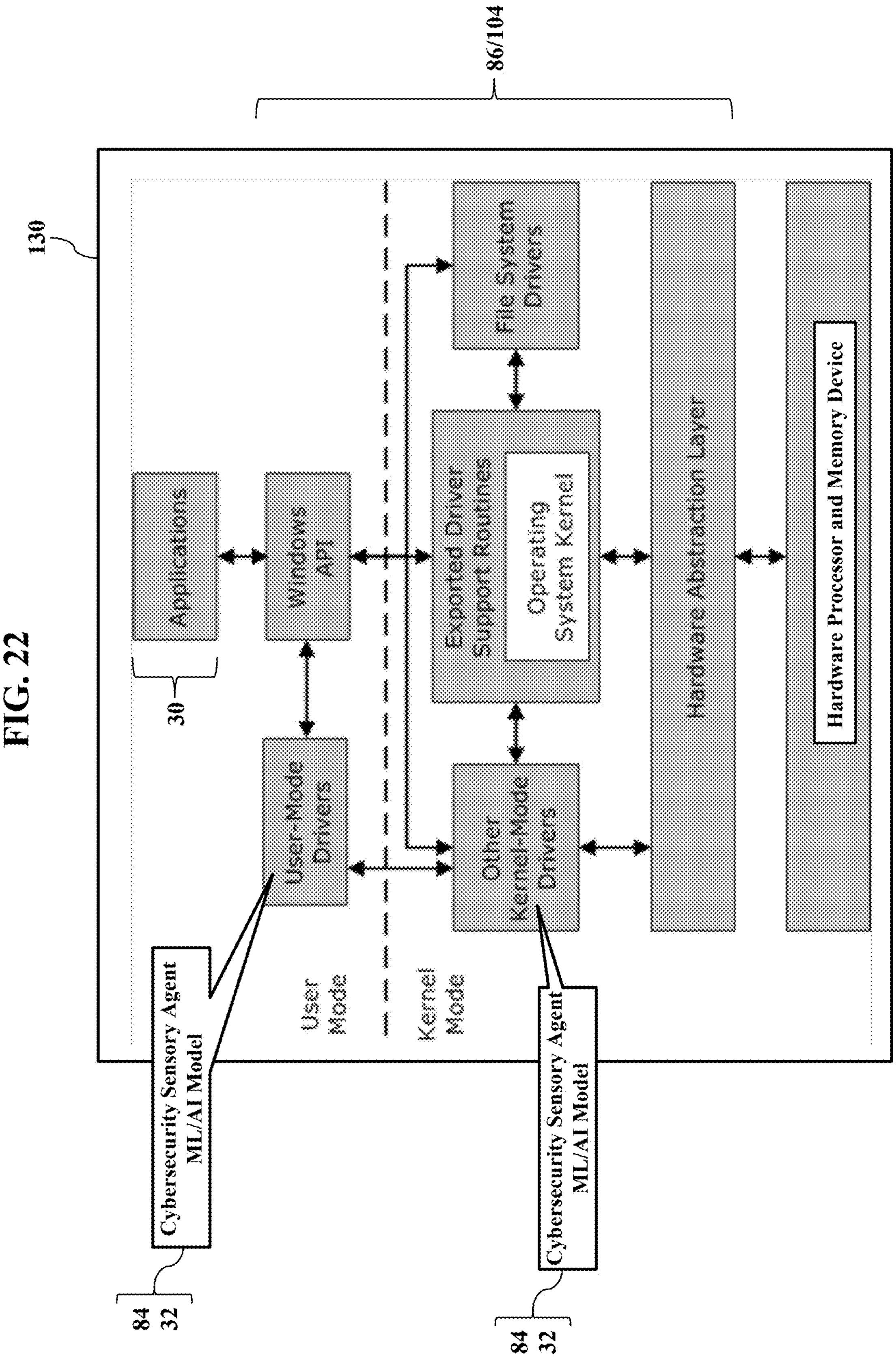
FIG. 22 illustrates examples of host monitoring.

FIG. 22 illustrates examples of host monitoring. The cybersecurity sensory agent 84 monitors the client device 130 for the ML/AI model 32. The cybersecurity sensory agent 84 interfaces with the host operating system 86/104 executed by the client device 130. The cybersecurity sensory agent 84 is a software application or program code stored in the memory device of the client device 130 and executed by the hardware processor operating within the client device 130. The cybersecurity sensory agent 84 may thus have permissions to monitor kernel-level model data and/or user-mode model data associated with the client device 130. Should the host operating system 86/104 notify the cybersecurity sensory agent 84 of any events associated with the ML/AI model 32, the cybersecurity sensory agent 84 cooperates with the operating system 86/104 to request the cybersecurity model assessment service 88 (as above explained).

The host operating system 86/104 notifies the cybersecurity sensory agent 84. Because the cybersecurity sensory agent 84 interfaces with its host's operating system 86/104, the operating system 86/104 may notify the cybersecurity sensory agent 84 of a software process requested by the ML/AI model 32. The operating system 86/104, for example, notifies the cybersecurity sensory agent 84 of a software application, a filename, a command line, and other information associated with the process and/or the ML/AI model 32. Moreover, the operating system 86/104 may also notify the cybersecurity sensory agent 84 at or within a timeframe of the process and/or of the ML/AI model 32. For example, before the operating system 86/104 starts or initializes the process associated with the ML/AI model 32, the operating system 86/104 may alert the cybersecurity sensory agent 84 (perhaps via event notifications). The cybersecurity sensory agent 84 thus alerts or notifies the cloud computing environment 22 that the ML/AI model 32 has been detected (e.g., the program or application, the process, communication, behavior, location, or some other evidence of the ML/AI model 32). The cybersecurity sensory agent 84 may also collect and report model data associated with the ML/AI model 32.

Figure 23:
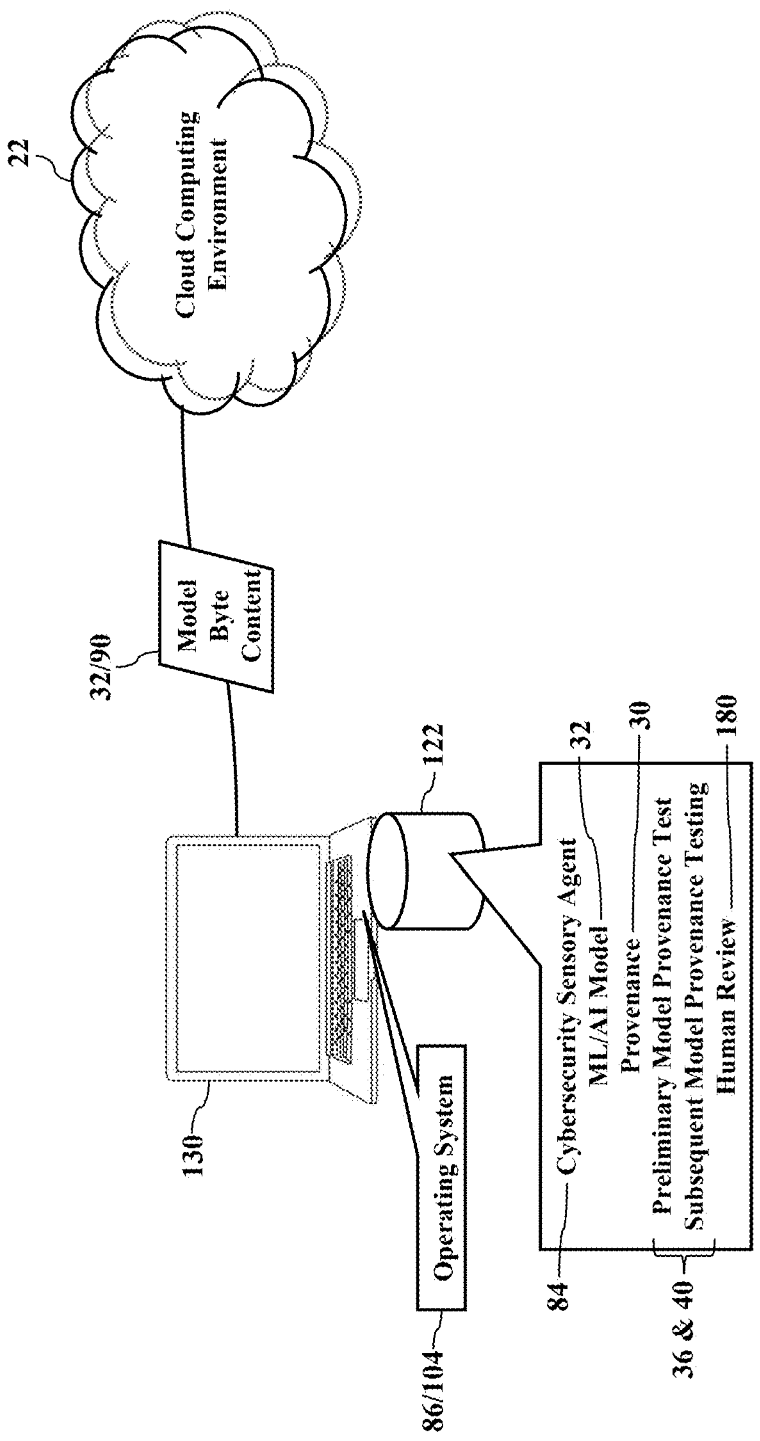
FIG. 23 illustrates examples of client assessment.

FIG. 23 illustrates more examples of local assessment. When the endpoint cybersecurity sensory agent 84 (installed to the client device 130) detects the ML/AI model 32, the cybersecurity sensory agent 84 may report the ML/AI model 3232 to the cloud computing environment 22. The cybersecurity sensory agent 84, however, may locally assess the ML/AI model 32 and locally predict its operational behavior (such as safe/normal operation 44 or the abnormal operation 46). The endpoint cybersecurity sensory agent 84, in other words, may locally conduct the cybersecurity model assessment service 88 with little, or no, reliance on the cloud computing environment 22. The cybersecurity sensory agent 84 may again cooperate with the operating system 86/104 and acquire one or more snapshots or samples of the model data associated with the ML/AI model 32. The cybersecurity sensory agent 84 may log and store the model data as entries in the electronic database 122. The electronic database 122, for example, may be a local resource (e.g., stored in the memory device of the client device 130) that maintains service records (such as illustrated with reference to FIG. 21). The cybersecurity sensory agent 84 may further include software programming, code, or instructions that locally compare ML/AI model 32 to the historical records logged in the database 122. The cybersecurity sensory agent 84 may thus conduct different model provenance tests (such as the preliminary model provenance test 36 or the subsequent model provenance testing 40) and generate the cybersecurity prediction 92. If, however, the one or more model provenance testing fails, the cybersecurity sensory agent 84 may request the human review 180. The cloud computing environment 22 may then queue the human review 180 while the cybersecurity sensory agent 84 waits or defers.

Figure 24:
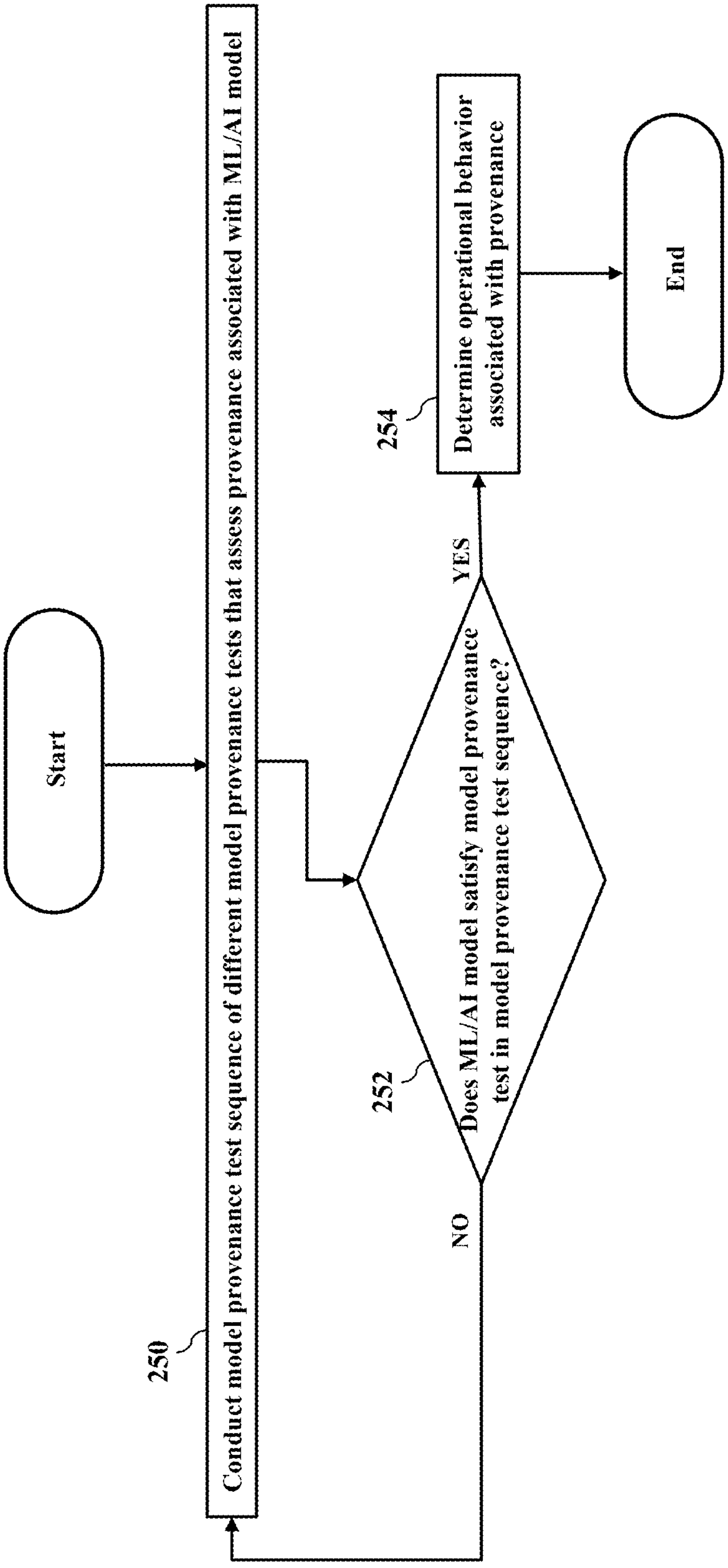
FIGS. 24-26 illustrate examples of methods or operations that assess ML/AI models.

FIG. 24 illustrates examples of a method or operations that assess the ML/AI model 32. The cybersecurity model assessment service 88 conducts the model provenance test sequence 190 of different model provenance tests associated with the digital cybersecurity service 28 that assesses the provenance 30 associated with the ML/AI model 32 (Block 250). When the ML/AI model 32 satisfies a model provenance test in the model provenance test sequence 190 of the different model provenance tests (Block 252), then the cybersecurity model assessment service 88 determines the operational behavior (such as 44 or 46) associated with the provenance 30 (Block 254). When, however, the ML/AI model 32 fails to satisfy the model provenance test in the model provenance test sequence 190 of the different model provenance tests (Block 252), then the cybersecurity model assessment service 88 conducts another model provenance test in the model provenance test sequence 190 that assesses the provenance 30 associated with the ML/AI model 32 (Block 250).

Figure 25:
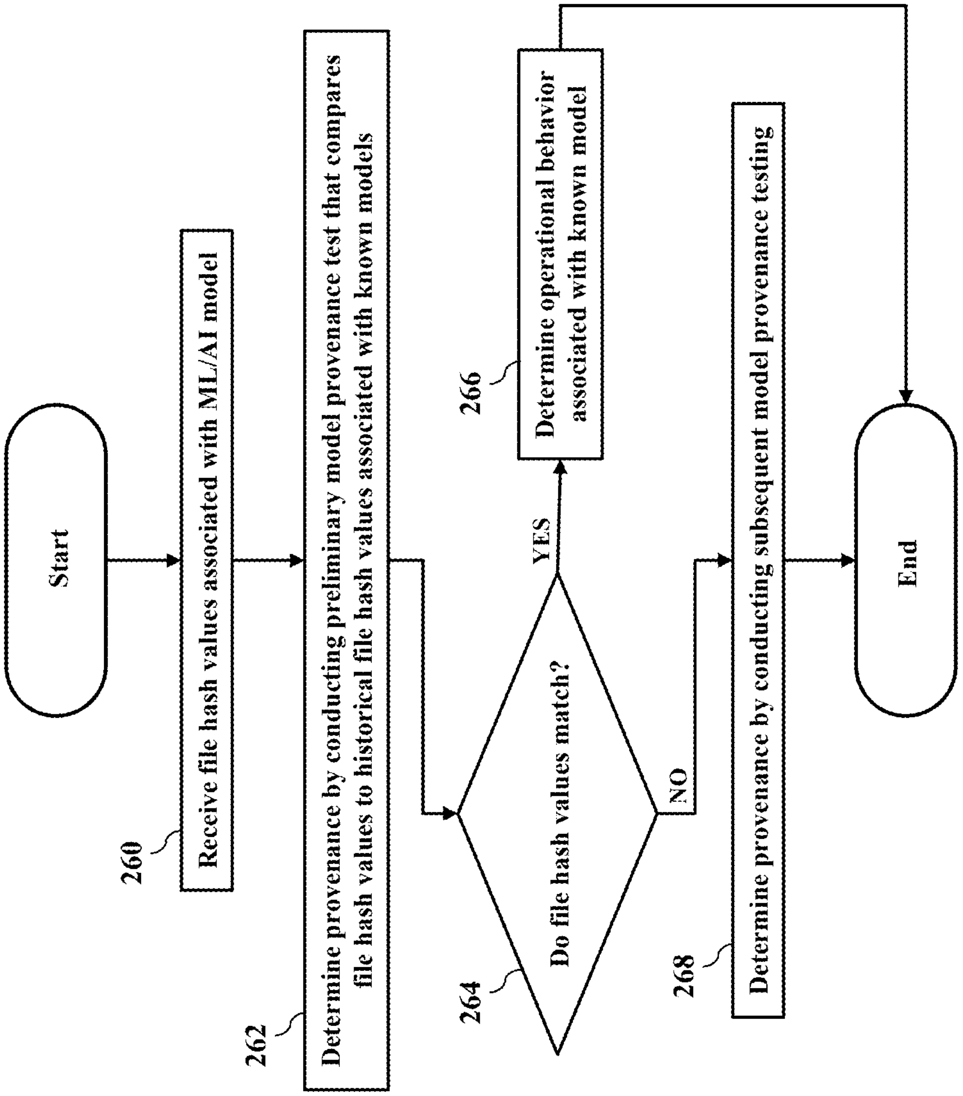

FIG. 25 illustrates examples of another method or operations that assess the ML/AI model 32. The cybersecurity model assessment service 88 receives the file hash values 136 associated with the ML/AI model 32 reported via the cloud computing environment 22 by the cybersecurity sensory agent 84 installed at the client device 130 (Block 260). The cybersecurity model assessment service 88 determines the provenance 30 associated with the ML/AI model 32 by conducting the preliminary model provenance test 36 associated with the digital cybersecurity service 28 that compares the file hash values 136 to the historical file hash values 138 associated with the known ML/AI models 38 and/or 50 (Block 262). When the file hash values 136 match the historical file hash values 138 associated with a known ML/AI model 38/50 (Block 264), then the cybersecurity model assessment service 88 determines the operational behavior (such as 44 or 46) associated with the known AI model (Block 266). When, however, the file hash values 136 fail to match the historical file hash values 138 (Block 264), then the cybersecurity model assessment service 88 determines the provenance 30 by conducting the subsequent model provenance testing 40 (Block 268).

Figure 26:
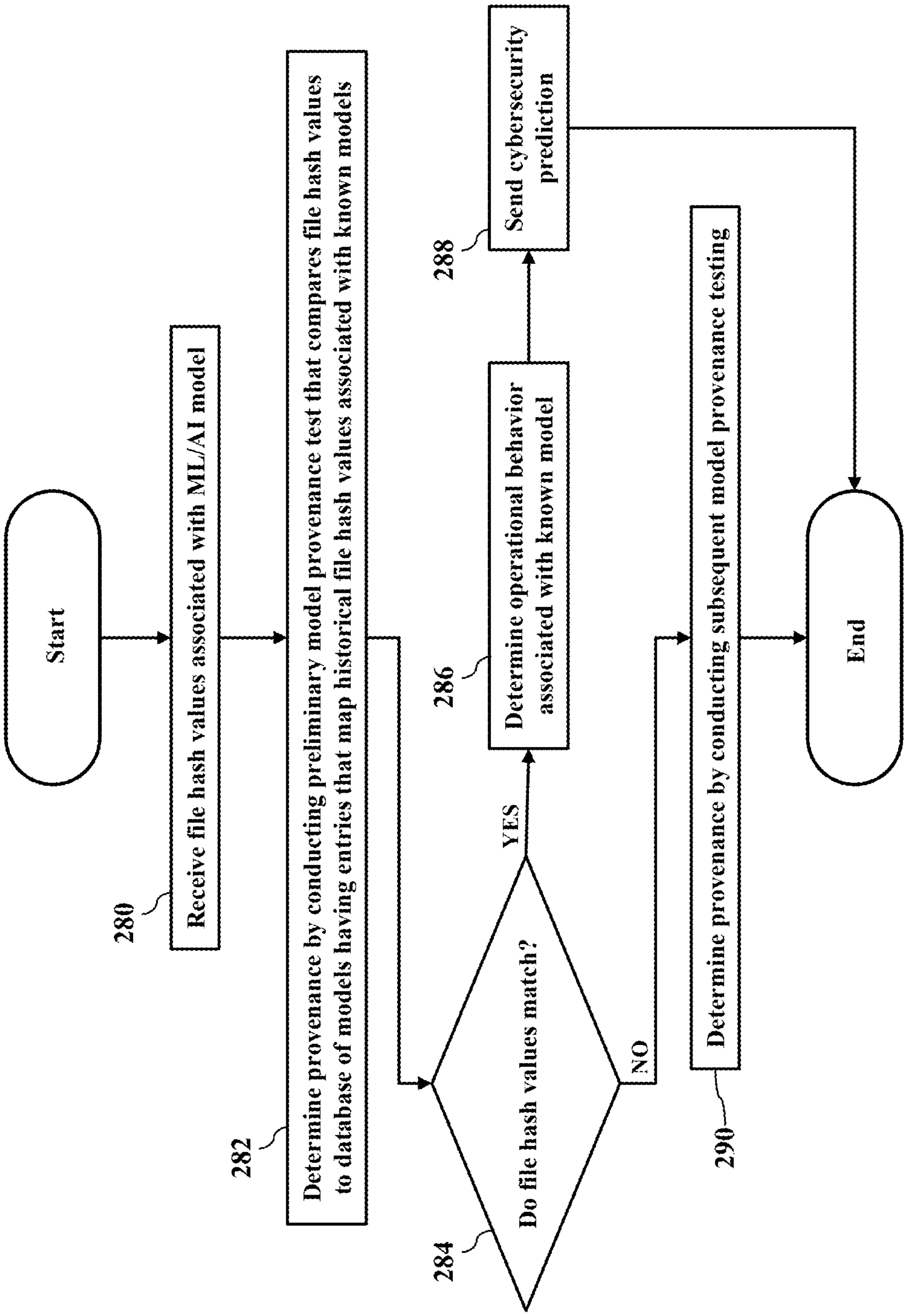

FIG. 26 illustrates examples of still more methods or operations that assess the ML/AI model 32. The cybersecurity model assessment service 88 receives the file hash values 136 associated with the ML/AI model 32 reported via the cloud computing environment 22 by the cybersecurity sensory agent 84 installed at the client device 130 (Block 280). The cybersecurity model assessment service 88 determines the provenance 30 associated with the ML/AI model 32 by conducting the preliminary model provenance test 36 associated with the digital cybersecurity service 28 that compares the file hash values 136 to entries in the database 122 of models that map the historical file hash values 138 to the known ML/AI models 38 and/or 50 previously assessed by the digital cybersecurity service 28 (Block 282). If the file hash values 136 associated with the ML/AI model 32 match the historical file hash values 138 mapped by the database 122 of models to a known ML/AI model 38/50 (Block 284), then the cybersecurity model assessment service 88 identifies the operational behavior (such as 44 or 46) mapped by the database 122 of models to the known ML/AI model 38/50 (Block 286). The cybersecurity model assessment service 88 sends the cybersecurity prediction 92 via the cloud computing environment 22 to the client device 130 that instructs the cybersecurity sensory agent 84 to allow or block the ML/AI model 32 (Block 288). If, however, the file hash values 136 fail to match the historical file hash values 138 (Block 284), then the cybersecurity model assessment service 88 determines the provenance 30 by conducting the subsequent model provenance testing 40 (Block 290).

Figure 27:
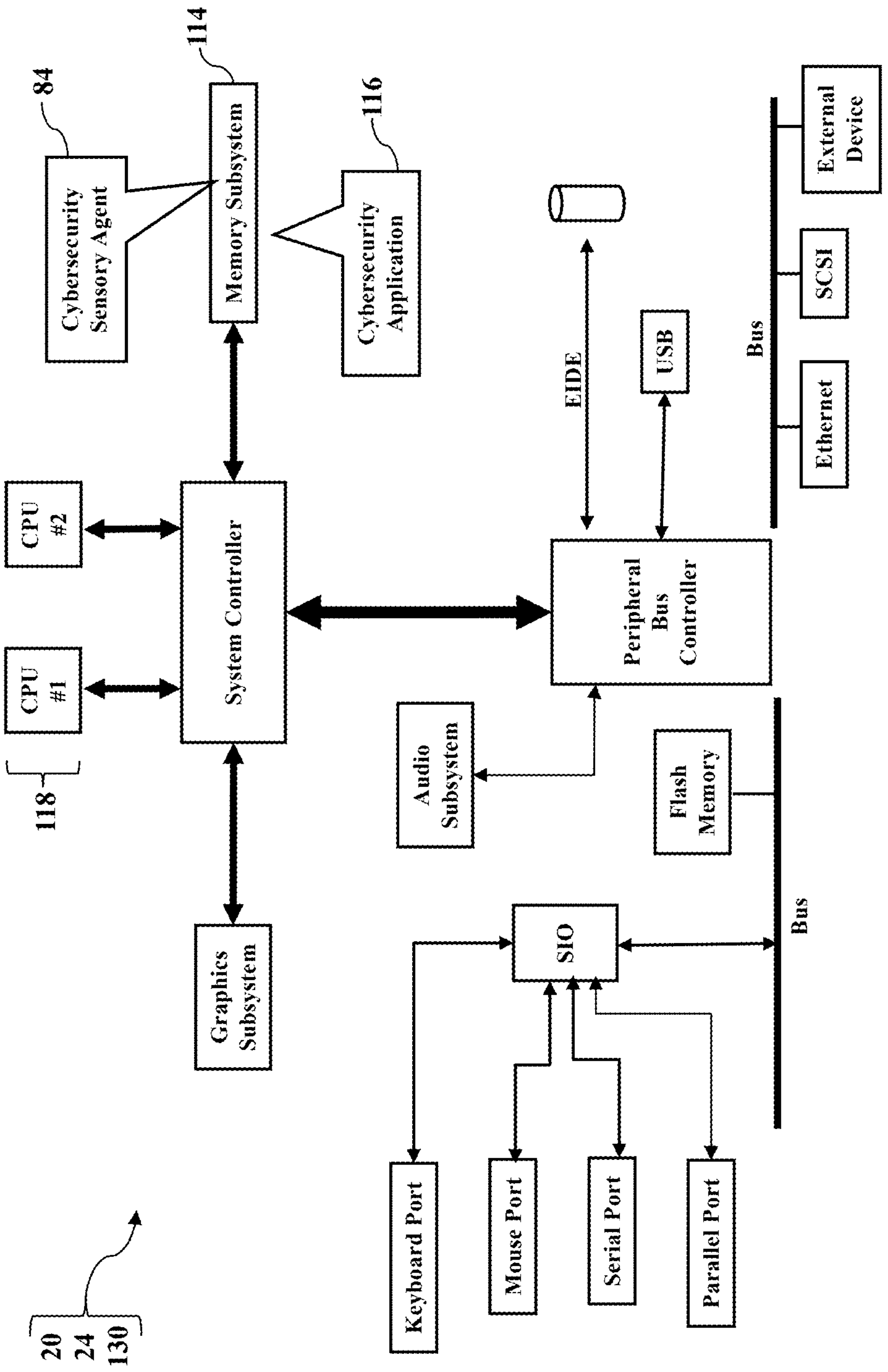
FIG. 27 illustrates a more detailed example of an operating environment.

FIG. 27 illustrates more detailed examples of the operating environment. FIG. 27 is a more detailed block diagram illustrating the computer system 20 and the client device 130. The cybersecurity application 116 and/or the endpoint cybersecurity sensory agent 84 is/are stored in the memory subsystem or device 114. One or more of the hardware processors 118 communicate with the memory subsystem or device 114 and execute the cybersecurity application 116 and/or the endpoint cybersecurity sensory agent 84. Examples of the memory subsystem or device 114 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and other read/write memory technology. Because the computer system 20 and the client device 130 is/are known to those of ordinary skill in the art, no detailed explanation is needed.

The computer system 20 and the client device 130 may have other embodiments. This disclosure mostly discusses the computer system 20 as the server 24 and the client device 130 as the smartphone 82 and as the cloud server 100. The cybersecurity model assessment service 88, however, may be easily adapted to other stationary or mobile computing examples, such as a desktop computer, a tablet computer, a smartwatch, and a network switch/router. The cybersecurity model assessment service 88 may also be easily adapted to other embodiments of smart devices, such as a television, an audio device, a remote control, and a recorder. The cybersecurity model assessment service 88 may also be easily adapted to still more smart appliances, such as washers, dryers, and refrigerators. Indeed, as cars, trucks, and other vehicles grow in electronic usage and in processing power, the cybersecurity model assessment service 88 may be easily incorporated into a vehicular controller.

The above examples of the cybersecurity model assessment service 88 may be applied regardless of the networking environment. The cybersecurity model assessment service 88 may be easily adapted to stationary or mobile devices having wide-area networking (e.g., 4G/LTE/5G/6G/7G cellular), wireless local area networking (WI-FI®), near field, and/or BLUETOOTH® capability. The cybersecurity model assessment service 88 may be applied to stationary or mobile devices utilizing any portion of the electromagnetic spectrum and a signaling standard (such as the IEEE 802 family of standards, GSM/CDMA/TDMA or other cellular standard, and/or the ISM band). The cybersecurity model assessment service 88, however, may be applied to a processor-controlled device operating in the radio-frequency domain and/or the Internet Protocol (IP) domain. The cybersecurity model assessment service 88 may be applied to a processor-controlled device utilizing a distributed computing network, such as the Internet (sometimes alternatively known as the "World Wide Web"), an intranet, a local-area network (LAN), and/or a wide-area network (WAN). The cybersecurity model assessment service 88 may be applied to a processor-controlled device utilizing power line technologies, in which signals are communicated via electrical wiring. Indeed, the many examples may be applied regardless of physical componentry, physical configuration, or communications standard(s).

The cybersecurity model assessment service 88 may utilize a processing component, configuration, or system. For example, the cybersecurity model assessment service 88 may be easily adapted to a desktop, mobile, or server central processing unit or chipset offered by INTEL®, ADVANCED MICRO DEVICES®, ARM®, APPLE®, TAIWAN SEMICONDUCTOR MANUFACTURING®, QUALCOMM®, or other manufacturer. The cybersecurity model assessment service 88 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The cybersecurity model assessment service 88 may be applied regardless of the operating system. The cybersecurity model assessment service 88 may be applied or adapted to processor-controlled devices executing the MICROSOFT® operating system (such as a version of the WINDOWS® and WINDOWS SERVER® operating systems). The cybersecurity model assessment service 88 may be applied or adapted to processor-controlled devices executing the APPLE® operating systems (such as a version of the MACOS®, IOS®, and OS® operating systems). The cybersecurity model assessment service 88 may be applied or adapted to processor-controlled devices executing a version of the LINUX®, ANDROID®, CHROMEOS®, UNIX®, and other operating systems.

The cybersecurity model assessment service 88 may use packetized communications. When the computer system 20 or the client device 130 communicates via communications networks, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The cybersecurity model assessment service 88 may utilize a signaling standard. The computer system 20, the client device 130, and/or the cloud computing environment 22 may mostly use wired networks to interconnect network members. However, the computer system 20, the client device 130, and/or the cloud computing environment 22 may utilize other communications devices using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or a variant of the GSM/CDMA/TDMA signaling standard. The cybersecurity model assessment service 88 may also utilize other standards, such as the I.E.E.E. 802 family of standards, the Industrial, Scientific, and Medical band of the electromagnetic spectrum, BLUETOOTH®, low-power or near-field, and other standard or value.

The cybersecurity model assessment service 88 may be physically embodied on or in a computer-readable storage medium. This computer-readable medium, for example, may include CD-ROM, DVD, tape, cassette, floppy disk, optical disk, USB flash memory drive, memory card, memory drive, and large-capacity disks. This computer-readable medium, or media, could be distributed to end-subscribers, licensees, and assignees. A computer program product comprises processor-executable instructions for assessing ML/AI models, as the above paragraphs explain.

The diagrams, schematics, illustrations, and the like represent conceptual views or processes illustrating examples of prioritizing the cybersecurity detections 28. The functions of the various elements shown in the figures may be provided through the use of dedicated hardware as well as hardware capable of executing instructions. The hardware, processes, methods, and/or operating systems described herein are for illustrative purposes and, thus, are not intended to be limited to a particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer system that assesses an artificial intelligence (AI) model, comprising:

receiving, by the computer system, model provenance data representing the AI model interrupted from processing by a cybersecurity sensory agent;

conducting, by the computer system, a sequence of different model provenance tests associated with a digital cybersecurity service that assesses a provenance associated with the AI model using the model provenance data;

in response to the AI model satisfying a preliminary model provenance test in the sequence of the different model provenance tests, then determining, by the computer system, an operational behavior associated with the provenance and allowing the AI model;

in response to the AI model failing to satisfy the model provenance test in the sequence of the different model provenance tests, then conducting, by the computer system, another model provenance test in the sequence of the different model provenance tests that continues assessing the provenance associated with the AI model; and in response to the AI model failing the sequence of the different model provenance tests, blocking, by the computer system, the AI model.

2. The method of claim 1, further comprising generating a cybersecurity prediction based on the operational behavior associated with the provenance.

3. The method of claim 1, further comprising assigning the operational behavior to the AI model.

4. The method of claim 1, further comprising determining the AI model fails to satisfy the sequence of the different model provenance tests.

5. The method of claim 1, further comprising determining the provenance by comparing file hash values associated with the AI model to historical file hash values associated with known AI models previously assessed.

6. The method of claim 5, further comprising determining the file hash values associated with the AI model match the historical file hash values associated with a known AI model of the known AI models previously assessed.

7. The method of claim 6, wherein in response to the determining that the file hash values associated with the AI model match the historical file hash values associated with the known AI model, then further comprising assigning the operational behavior associated with the known AI model to the AI model.

8. A computer system that that assesses an artificial intelligence (AI) model, comprising:

at least one central processing unit; and at least one memory device storing instructions that, when executed by the at least one central processing unit, perform operations, the operations comprising:

receiving model hash values representing the AI model interrupted from processing by a cybersecurity sensory agent installed at a client device;

determining a provenance associated with the AI model by conducting a preliminary model provenance test associated with a digital cybersecurity service that compares the model hash values to historical model hash values associated with known AI models;

in response to a match between the model hash values and the historical model hash values associated with a known AI model of the known AI models, then authorizing an operational behavior associated with the known AI model and allowing AI model;

in response to a match failure between the model hash values associated with the AI model and the historical file hash values associated with the known AI models, then determining a failure of the preliminary model provenance test and conducting subsequent model provenance testing of the AI model; and in response to the AI model failing the subsequent model provenance testing, blocking the AI model.

9. The computer system of claim 8, wherein the operations further comprise determining the AI model is abnormal operation based on the provenance.

10. The computer system of claim 8, wherein the operations further comprise determining the AI model is normal operation based on the provenance.

11. The computer system of claim 8, wherein the operations further comprise resuming the processing of the AI model.

12. The computer system of claim 8, wherein the operations further comprise identifying the operational behavior.

13. The computer system of claim 8, wherein the operations further comprise blocking or allowing the operational behavior.

14. The computer system of claim 8, wherein the operations for the conducting of the subsequent model provenance testing further comprise conducting a sequence of different model provenance tests.

15. The computer system of claim 8, wherein the operations further comprise randomly conducting the subsequent model provenance testing.

16. A memory device storing instructions that, when executed by at least one central processing unit, perform operations, comprising:

receiving model hash values representing an AI model interrupted from processing by a cybersecurity sensory agent installed at a client device;

determining a provenance associated with the AI model by conducting a preliminary model provenance test associated with a digital cybersecurity service that compares the model hash values to entries in a database of models that map historical model hash values to known AI models previously assessed by the digital cybersecurity service;

in response to a match between the model hash values associated with the AI model and the historical file hash values mapped by the database of models to a known AI model of the known AI models, then authorizing an operational behavior mapped by the database of models to the known AI model and allowing the AI model;

in response to a match failure between the file hash values associated with the AI model and the historical file hash values mapped by the database of models to the known AI models, then determining a failure of the preliminary model provenance test and conducting subsequent model provenance testing; and in response to the AI model failing the subsequent model provenance testing, blocking the AI model.

17. The memory device of claim 16, wherein the operations further comprise determining the operational behavior is normal or abnormal based on the match between the model hash values associated with the AI model and the historical file hash values mapped by the database of models to the known AI model.

18. The memory device of claim 16, wherein the operations for the conducting of the subsequent model provenance testing further comprise conducting a sequence of different model provenance tests.

19. The memory device of claim 16, wherein the operations further comprise randomly conducting the subsequent model provenance testing.

20. The memory device of claim 16, wherein the operations for the conducting of the subsequent model provenance testing further comprise instructing the cybersecurity sensory agent to execute a local similarity analysis of the AI model while the processing is interrupted.

* * * * *